(12) United States Patent
Samurov et al.

(10) Patent No.: US 9,338,345 B2
(45) Date of Patent: May 10, 2016

(54) RELIABILITY MEASUREMENTS FOR PHASE BASED AUTOFOCUS

(71) Applicant: Intel Corporation, Santa Clara, CA (US)

(72) Inventors: Vitali Samurov, Tampere (FI); Evgeny Krestyannikov, Tampere (FI); Jarno Nikkanen, Kangasala (FI)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/327,798

(22) Filed: Jul. 10, 2014

(65) Prior Publication Data

US 2015/0365584 A1    Dec. 17, 2015

Related U.S. Application Data

(60) Provisional application No. 62/011,897, filed on Jun. 13, 2014.

(51) Int. Cl.
*H04N 5/232* (2006.01)
*G03B 13/36* (2006.01)

(52) U.S. Cl.
CPC ............ *H04N 5/23212* (2013.01); *G03B 13/36* (2013.01)

(58) Field of Classification Search
CPC ............ H04N 5/23212; H04N 5/2356; H04N 5/23293; G03B 13/36; G03B 13/32; G03B 13/34; G02B 7/36; G02B 7/28; G02B 7/282
See application file for complete search history.

(56) References Cited

U.S. PATENT DOCUMENTS

| 8,885,090 | B2 * | 11/2014 | Oshima | ............. | H04N 5/23212 348/345 |
| 2004/0202461 | A1 * | 10/2004 | Nakahara | ............... | G02B 7/285 396/104 |
| 2008/0158409 | A1 * | 7/2008 | Gotanda | ............ | G06K 9/00255 348/348 |
| 2011/0052169 | A1 * | 3/2011 | Arita et al. | ............. | G03B 13/34 396/121 |
| 2012/0300116 | A1 * | 11/2012 | Nakamoto | ......... | H04N 5/23212 348/349 |

* cited by examiner

*Primary Examiner* — Luong T Nguyen
(74) *Attorney, Agent, or Firm* — Green, Howard & Mughal LLP

(57) ABSTRACT

Techniques related to autofocus for imaging devices and, in particular, to generating reliability values associated with phase autofocus shifts are discussed. Such techniques may include performing a curve fitting based on accumulated phase difference values and phase shifts for phase autofocus images and generating a reliability value for a focus phase shift based on the curve fitting.

25 Claims, 8 Drawing Sheets

800

Determine, for a Region of Interest of a Scene, Accumulated Phase Difference Values associated with Phase Shifts for Phase Autofocus Images
801

Perform a Curve Fitting based on the Accumulated Phase Difference Values and Phase Shifts to Generate an Accumulated Phase Difference Values Fitted Curve
802

Generate a Reliability Value associated with a Focus Phase Shift For based on the Accumulated Phase Difference Values Fitted Curve
803

Focus an Imaging Device based on the Reliability Value
804

FIG. 8

RELIABILITY MEASUREMENTS FOR PHASE BASED AUTOFOCUS

RELATED APPLICATIONS

The present application claims the benefit of U.S. Provisional Application No. 62/011,897 filed Jun. 13, 2014, and titled "RELIABILITY MEASUREMENTS FOR PHASE BASED AUTOFOCUS", the contents of which are hereby incorporated by reference in their entirety.

BACKGROUND

In digital cameras, autofocus may be used to focus on an object of interest. Such digital cameras may be provided as stand alone devices or they may be integrated into a multipurpose device such as a smartphone or the like. In various implementations, digital cameras may use phase based autofocus (or phase autofocus) or contrast based autofocus. Currently, mobile camera devices such as point and shoot cameras and mobile cameras integrated into multipurpose devices such as smartphones tend to use contrast based autofocus, but phase autofocus is becoming more widespread in such mobile camera devices. For example, phase autofocus may be advantageous in some implementations because it is typically faster than contrast based autofocus. For example, phase autofocus may allow a digital camera to determine the correct direction and amount of lens position movement based on a single frame of captured information, which may increase focusing speed. Furthermore, phase autofocus may be advantageous because it limits or eliminates overshoot (e.g., the camera changing lens position past the position of focus to obtain the information needed to determine the position of focus as performed in contrast based autofocus). Such overshoots take time and can reduce quality in video capture.

However, phase autofocus is not reliable for all scenes and in all conditions. Such problems may be particularly pronounced in small sized digital cameras, cameras integrated into smartphones, and mass produced digital cameras.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8 is a flow diagram illustrating an example process for providing autofocus;

DETAILED DESCRIPTION

Figure 1:
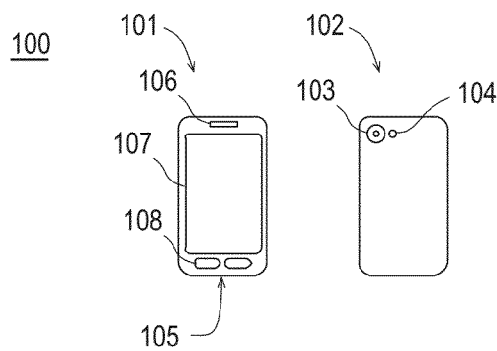
FIG. 1 is an illustrative diagram of an example imaging device for providing autofocus.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to providing autofocus for imaging devices and, in particular, for generating a reliability value or reliability value for a focus phase shift generated based on phase autofocus.

As described above, digital cameras (e.g., cameras or cameras integrated within devices such as smartphones or the like) may perform autofocus using phase autofocus or contrast based autofocus. In some instances, a digital camera may use phase autofocus, which is advantageously faster and can eliminate overshoot. However, phase autofocus may be unreliable in some scenes and/or conditions.

In some embodiments discussed herein, a confidence or reliability value or measurement associated with a focus phase shift (e.g., a phase shift measured in pixels with sub-pixel accuracy determined to bring the camera into focus) may be generated. As used herein, the confidence or reliability value or measurement may be characterized as a reliability value. The reliability value may provide, as its name implies, a level of reliability or confidence in the focus phase shift. Such a reliability value may be used by the digital camera to perform autofocus and, in some examples, to implement a hybrid autofocus system including phase autofocus and contrast based autofocus. For example, when the reliability value is high, the digital camera may use the focus phase shift to determine a lens position shift (e.g. based on motor units or the like), shift the lens position, and provide autofocus to a user based on phase autofocus. As discussed, such an autofocus may be fast and without overshoot. In examples when the reliability value is low, the digital camera may employ contrast based autofocus or a combination of phase autofocus and contrast based autofocus to determine a lens position shift, shift the lens position, and provide autofocus to the user.

In some embodiments, the reliability value may be generated by determining, for a region of interest (e.g., a region being used to focus the imaging device) of a scene (e.g., the scene being captured), accumulated phase difference values associated with phase shifts for two phase autofocus images. For example, the phase autofocus images may be a left phase autofocus image and a right phase autofocus image received via pairs of phase autofocus pixel sensors (e.g., such that each pixel is associated with a pixel sensor) interspersed in an image sensor. A curve fitting may be performed based on the accumulated phase difference values and phase shifts to generate an accumulated phase difference values fitted curve, as is discussed further herein, and the reliability value may be generated based on the fitted curve (e.g., an analysis of the fitted curve). The focusing of an imaging device may be based at least in part on the reliability value such that, for example, the imaging device may choose between phase autofocus and contrast autofocus based on the reliability value, or adapt the lens movement step size as a function of the reliability value.

Using such techniques, autofocus may be provided that, in some scenes and conditions, is based on phase autofocus and is thereby fast and without overshoot. In other scenes and conditions that are not suitable for phase autofocus, autofocus may be provided that is based on contrast based autofocus (or a combination of contrast based autofocus and phase autofocus) such that high quality autofocus (although slower) may be provided for such scenes and conditions.

FIG. 1 is an illustrative diagram of an example imaging device 100 for providing autofocus, arranged in accordance with at least some implementations of the present disclosure. As shown in FIG. 1, in an embodiment, imaging device 100 is a smartphone. As shown, imaging device 100 may include a front 101 and a back 102. In some examples, as shown, the back 102 of imaging device 100 may include an integrated camera 103 (e.g., including a lens, an aperture, and an imaging sensor) and a flash 104 (e.g., a flash or flash light such as a supercapacitor LED or the like). Also as shown, the front 101 of imaging device 100 may include a speaker 106, a display 107, and one or more buttons 108. Furthermore, imaging device 100 may include a microphone 105, which in the illustrated example is shown on the bottom of imaging device 100. Such devices may provide for a variety of uses of imaging device 100.

The described components of imaging device 100 may be incorporated in any suitable manner. For example, camera 103 and flash 104 may be incorporated on the front 101 of imaging device 100. In some examples, both a front and back camera and flash may be incorporated into imaging device 100. Furthermore, in some examples, display 107 may be a touch screen display such that a user may interact with imaging device 100 via commands initiated via display 107 such as tapping display 107 to indicate an object or region of interest for focusing. As discussed, in some examples, imaging device 100 may include each of the described components. In other examples, imaging device 100 may not include one or more of the described components. For example, imaging device 100 may not include speaker 106, display 107, and/or microphone 105. Furthermore, the discussed components may incorporated into any form factor device such as the illustrated smartphone, a dedicated camera, an ultrabook, a laptop, a tablet, or any other device discussed herein. For example, dedicated cameras may include point and shoot cameras, interchangeable lens system cameras, mirror-less cameras, digital single-lens reflex (DSLR) cameras, and so on.

As discussed, camera 103 may include an image sensor. The image sensor may capture image data and phase autofocus data as discussed herein.

Figure 2:
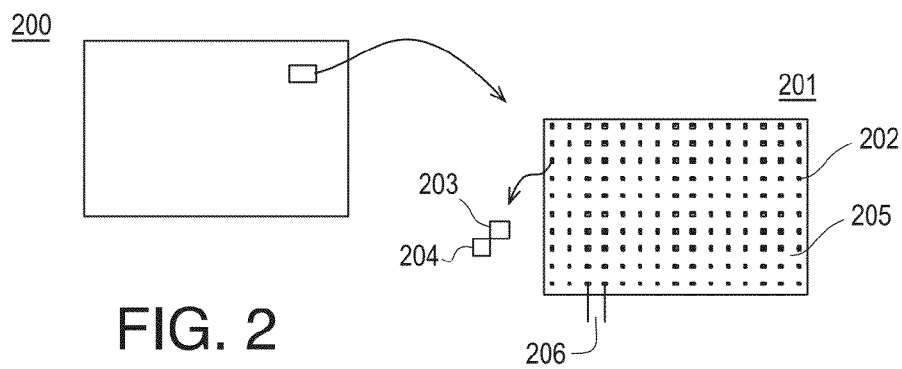
FIG. 2 is an illustrative diagram of an example sensor for providing autofocus.

FIG. 2 is an illustrative diagram of an example sensor 200 for providing autofocus, arranged in accordance with at least some implementations of the present disclosure. As shown in FIG. 2, sensor 200 may include (as shown via close up view 201) pairs of phase autofocus pixel sensors 202 interspersed among image pixel sensors 205, which are not illustrated separately for the sake of clarity of presentation. For example, sensor 200 may include any number of image pixel sensors 205 such as 8 megapixels, 10 megapixels, 12 megapixels, or the like and any number of pairs of phase autofocus pixel sensors 202 such as, for example, 300,000 pairs, 400,000 pairs, or 500,000 pairs or the like. For example, pairs of phase autofocus pixel sensors 202 may have a density sufficient to provide the resolution to perform the techniques discussed herein. Image pixel sensors 205 and pairs of autofocus pixel sensors 202 may include any suitable photo sensors such as charge-coupled devices, active pixel sensors, photodiodes, or any other devices that convert light into an electrical signal.

Furthermore, the pairs of pixels in pairs of phase autofocus pixel sensors 202 may be arranged in any suitable manner such that they may attain two phase autofocus images as discussed herein. For example, as shown in FIG. 2, pairs of phase autofocus pixel sensors 202 may be arranged diagonally and adjacent to one another as shown with respect to phase autofocus pixel sensor 203 and phase autofocus pixel sensor 204. In other examples, phase autofocus pixel sensor 203 and phase autofocus pixel sensor 204 may be arranged horizontally and adjacent to one another or vertically and adjacent to one another. In the illustrated example, phase autofocus pixel sensors 203, 204 are shown substantially next to each other. In other examples, phase autofocus pixel sensors 203, 204 may be separated by a distance such that they are not next to each other and such that one or more image pixel sensors 205 are between them. Pairs of phase autofocus pixel sensors 202 may be arranged in any manner on sensor 200 such as uniformly as shown in FIG. 2 or in a varying pattern. Furthermore, pairs of autofocus pixel sensors 202 may be separated by an offset 206. Offset 206 may associated with a phase shift as is discussed further herein. Pairs of phase autofocus pixel sensors 202 may record light rays separately (as is discussed further with respect to FIG. 3) such that one sensor of the pair may record light rays entering from a left side of an aperture and the other sensor of the pair may record light rays entering from a right side of the aperture. Such separation may be provided in any suitable manner such as overlaying an extra metal layer on sensor 200 that blocks light from the left or the right or the like. Furthermore, use of the terms left and right herein are provided for clarity of presentation only. For example, the light rays may be oriented left and right as described or top and bottom or any other orientation that may provide for the separate images needed for phase autofocus.

The separate recording of left and right light rays may provide for two phase autofocus images (e.g., a left image and a right image). For example, the left and right images may be based on a same image frame and/or image. In some examples, left and right images may be attained via phase autofocus pixel sensors 203, 204 of sensor 200. In some examples, no separate and full left and right images or image planes may be available and instead a pixel stream from sensor 200 (e.g., of PAF sensor data 407 as is discussed further below) may be processed on-the-fly (e.g., image processing and autofocus module 401, as discussed further below, may have only one or two lines of a frame at a time). Similarly, left and right images as described herein may include a stream of data associated with the left and right images (e.g. without full images being fully available at any time). As used herein, the term image includes fully formed images or image planes or partially formed images or image planes or data representing such fully or partially formed images or image planes.

Furthermore, as is discussed further herein, phase autofocus may be provided by shifting those images with respect to one another (e.g., horizontally as discussed herein or vertically) to determine a focus phase shift (e.g., a shift that may align the images and thereby provide focus). Furthermore a reliability value may be generated that is associated with the focus phase shift as discussed herein. For example, pairs of phase autofocus pixel sensors 202 may provide left and right grayscale images of a particular pixel density (e.g., associated with offset 206) such that phase shifts may be performed to evaluate the attained phase autofocus images. Furthermore, a sub-pixel resolution focus phase shift may be attained via curve fitting and/or interpolation as is discussed further herein. In some examples, the camera sensor area of sensor 200 may be divided into a grid that includes blocks (e.g., 16×12 blocks) with each block covering the area of multiple pixels such that some of the covered pixels are phase autofocus (PAF) pixels.

Figure 3:
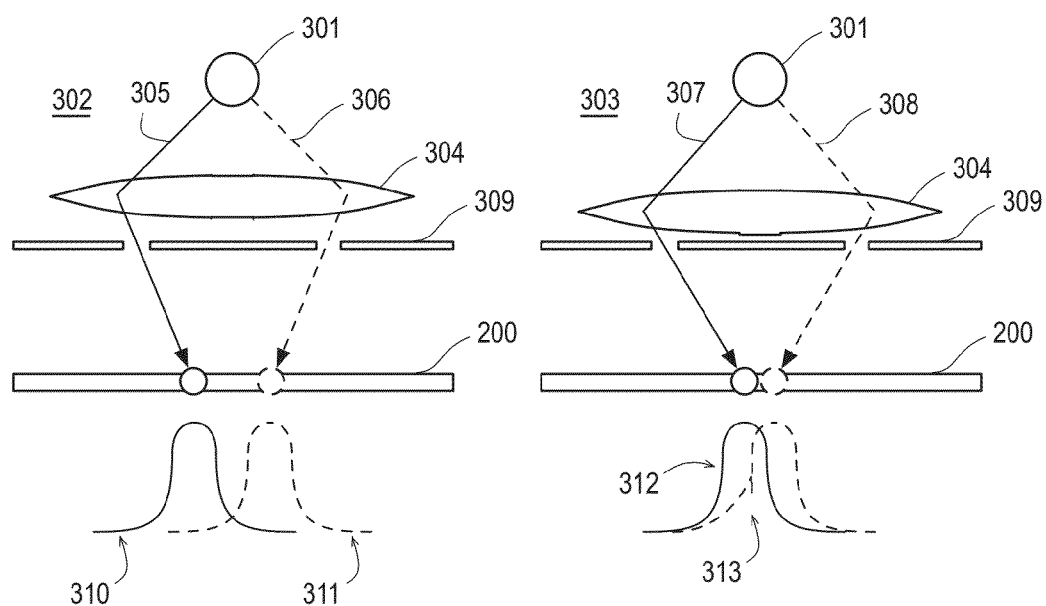
FIG. 3 illustrates example intensity profiles for providing autofocus.

FIG. 3 illustrates example intensity profiles for providing autofocus, arranged in accordance with at least some implementations of the present disclosure. As shown in FIG. 3, an object 301 may be focused on in two lens positions 302 and 303. Furthermore, as shown, light rays 305-308 may reflect from object 301 and pass through optics 304 and aperture 309 and onto sensor 200. Light ray 305 and light ray 306 may be recorded separately by phase autofocus pixel sensors 202 of sensor 200 and, similarly, light ray 307 and light ray 308 (after a change in lens position or the like) may be recorded separately by phase autofocus pixel sensors 202 of sensor 200 to generate intensity profiles 310-313, respectively. Although illustrated as a one-dimensional (1D) signals in FIG. 3, intensity profiles 310-313 may be two-dimensional (2D) signals provided over an area of sensor 200. If intensity profiles from separately recorded light rays are aligned or nearly aligned (e.g., if intensity profile 310 and 311 were aligned or if intensity profiles 312 and 313 were aligned), object 301 is in focus. In some examples, whether intensity profiles are aligned may be determined based on evaluating differences pixel pair by pixel pair inside a 2D area of sensor 200. In the example illustrated in FIG. 3, lens positions 303 is in better focus than lens positions 302 while neither of them are perfectly in focus. Furthermore, lens positions 302, 303 are both focused too far from object 301. Although not shown in FIG. 3, a too near lens position would provide for crossed light rays (e.g., light ray 305 and light ray 306 would cross prior to reaching sensor 200) and, based on whether or not the light rays cross, a direction of lens position movement may be determined. Thereby, based on the distance between the peaks of intensity profiles 310-313 and their orientations with respect to each other (e.g., which one is on the left), a phase autofocus shift and direction may be determined for imaging device 100. In some examples, the phase autofocus shift may be characterized as a phase difference or phase difference information. For example, the phase autofocus shift or phase difference may be an amount of shift (e.g., in pixels, with sub-pixel accuracy) that is needed to eliminate the difference between the left-PAF and the right-PAF pixels (or top-PAF vs. bottom PAF).

Figure 4:
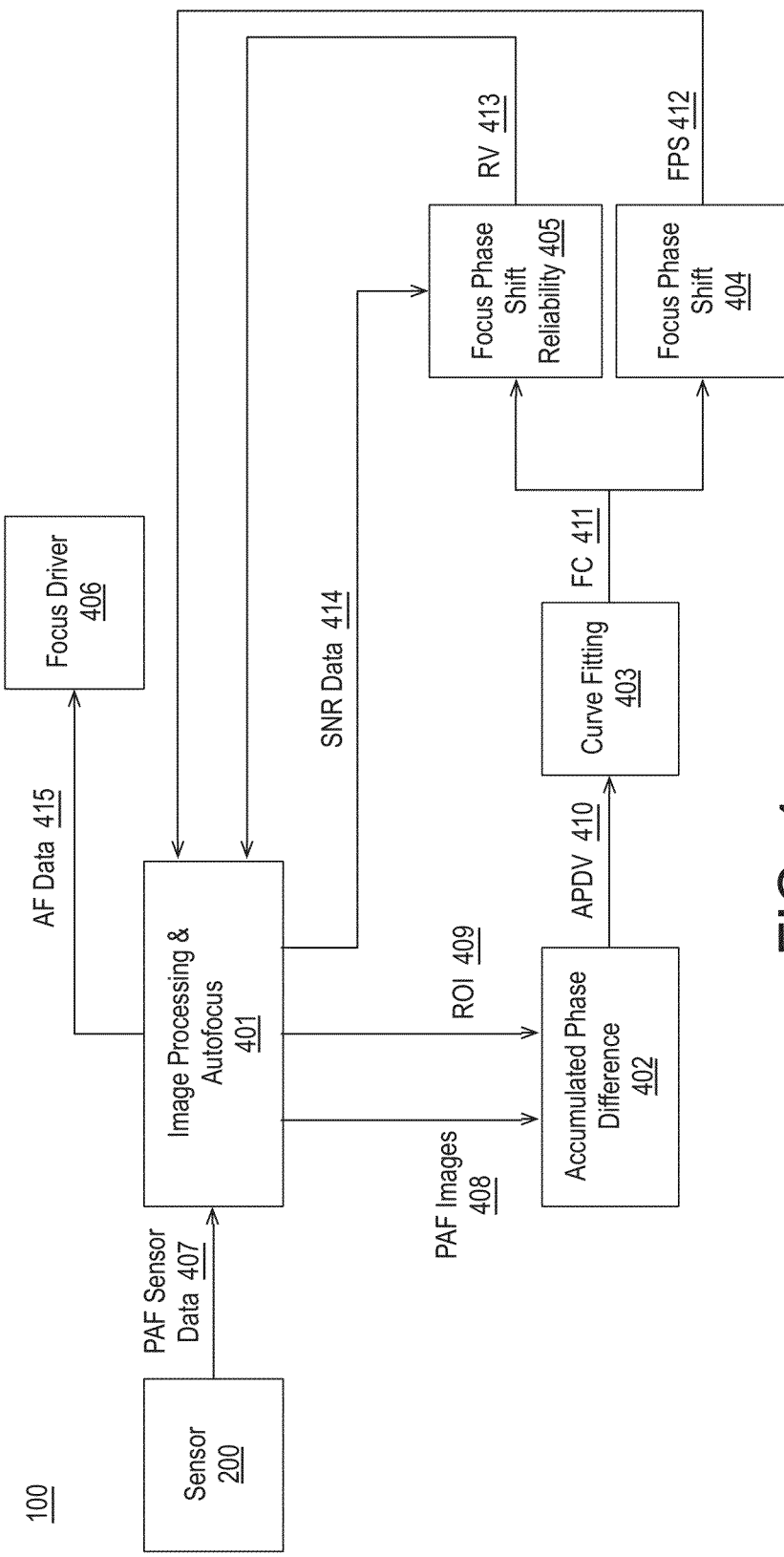
FIG. 4 is an illustrative block diagram of an example imaging device.

FIG. 4 is an illustrative block diagram of example imaging device 100, arranged in accordance with at least some implementations of the present disclosure. As shown in FIG. 4, imaging device 100 may include sensor 200, an image processing and autofocus module 401, an accumulated phase difference module 402, a curve fitting module 403, a focus phase shift module 404, a focus phase shift reliability module 405, and a focus driver 406. In various examples, any of modules 401-406 of imaging device 100 may be implemented via one or more central processing unit(s), image processing units, and/or graphics processing unit(s) as is discussed further herein.

As shown in FIG. 4, image processing and autofocus module 401 may obtain phase autofocus (PAF) sensor data 407 from sensor 200. For example, PAF sensor data 407 may be provided via pairs of phase autofocus pixel sensors 202 of sensor 200 as discussed herein. PAF sensor data 407 may include any suitable data such as an electrical signal indicating sensor intensities or the like. In some examples, PAF sensor data 407 may be temporarily stored in a memory of imaging device 100. Image processing and autofocus module 401 may receive PAF sensor data 407 from sensor 200 or memory and may generate phase autofocus (PAF) images 408 or portions of phase autofocus images in real-time and on-the-fly as discussed herein. For example, PAF images 408 may include a first PAF image and a second PAF image such as left and right PAF images as discussed herein. In some examples, PAF images 408 include grayscale images associated with intensities measured or attained at pairs of phase autofocus pixel sensors 202. As discussed, in some examples, no separate and full left and right images (e.g., PAF images 408) or image planes may be available and instead a pixel stream from sensor 200 (e.g., of PAF sensor data 407) may be processed on-the-fly (e.g., image processing and autofocus module 401 may have only one or two lines of a frame at a time). Similarly, left and right images as described herein may include a stream of data associated with the left and right images (e.g. without full images being fully available at any time). For example, image processing and autofocus module 401 as implemented via an image signal processor (ISP) may receive PAF sensor data 407 and provide PAF images 408 (or portions thereof) on-the-fly and subsequent modules as described herein may process data on-the-fly without attaining full image data or the like.

Figure 5:
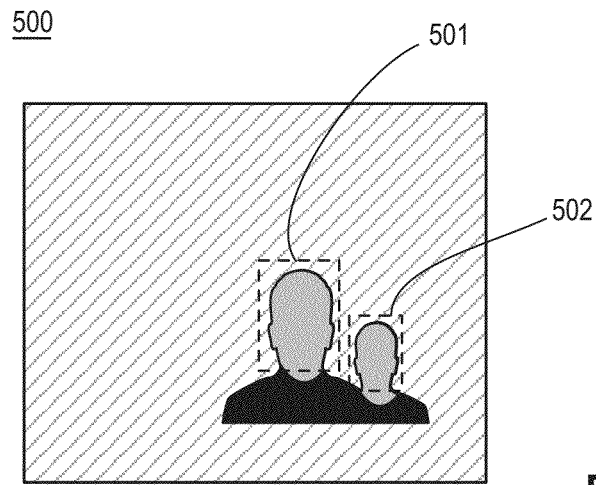
FIG. 5 illustrates an examples scene including example regions of interest.

Furthermore, image processing and autofocus module 401 may generate a region of interest 409 (or multiple regions of interest). FIG. 5 illustrates an examples scene 500 including example regions of interest 501, 502, arranged in accordance with at least some implementations of the present disclosure. FIG. 5 illustrates an example scene 500 such as a scene that a user is photographing or videoing. As shown, scene 500 may include regions of interest 501, 502 such that it may be desirable for imaging device 100 to focus on regions of interest 501, 502 and/or for imaging device 100 to determine, if regions of interest 501, 502 correspond to different distances from imaging device 100, whether to focus on region of interest or region of interest 502 (e.g., based on an object in regions of interest being closer, larger, closer to a center of scene 500, or the like). Regions of interest 501, 502 may be determined by imaging device 100 (e.g., via image processing and autofocus module 401 or another module of imaging device 100) using any suitable technique or techniques. For example, regions of interest 501, 502 may be determined based on object detection or recognition techniques or face detection techniques or the like. In other examples, a user may tap display 107 to indicate a region of interest or a region of interest may be a default position of scene 500 such as the center of the scene or the like. Although illustrated with two regions of interest, any number of regions of interest may be used.

Returning to FIG. 4, region of interest 409 may define region(s) of interest in any suitable manner such as providing a boundary of the region of interest or a position and dimensions of the region of interest or the like. Furthermore, as shown, in some examples, image processing and autofocus module 401 may provide PAF images 408 and region of interest 409. In other examples, image processing and autofocus module 401 may only provide image data associated with the regions of interest. For example, image processing and autofocus module 401 may provide phase autofocus image data only for the regions of interest to accumulated phase difference module 402. Image processing and autofocus module 401 may provide PAF images 408 and region of interest 409 (or equivalent information) to accumulated phase difference module 402 and/or to a memory of imaging device 100.

As shown, image processing and autofocus module 401 may also generate signal-to-noise ratio (SNR) data 414. Signal-to-noise ratio data 414 may include any suitable data indicative of a measure of signal-to-nose ratio in region of interest 409. For example, signal-to-noise ratio data 414 may include an analog gain, lens shading correction (LSC) gain, a digital gain, an on-sensor gain, other gains, or signal levels, or the like. For example, such data may be available via an imaging processing module or image processing pipeline or the like of image processing and autofocus module 401. Image processing and autofocus module 401 may transfer signal-to-noise ratio data 414 to focus phase shift reliability module 405 and/or a memory of imaging device 100.

Accumulated phase difference module 402 may receive PAF images 408 and region of interest 409 (or equivalent information) from image processing and autofocus module 401 or memory and accumulated phase difference module 402 may determine, for region of interest 409, accumulated phase difference values (APDV) 410. As used herein, the term difference may refer to the difference between two phase autofocus pixels next to each other (e.g., pairs of autofocus pixels) or paired for a phase shift, in which one pixel is receiving light from the left (or top) side of an aperture (e.g., denoted as pafpix$_L$(x,y) herein) and the other pixel is receiving light from the right (or bottom) side of the aperture (e.g., denoted as pafpix$_R$(x,y) herein). As discussed, left and right are used for the sake of clarity of presentation, but any opposing or opposite sides (e.g. top and bottom or the like) may be used. As discussed, the pair of phase autofocus pixels may be next to each other (e.g., adjacent or spatially close). In some examples, the pair of phase autofocus pixels are diagonally next to each other (e.g., as Gr and Gb pixels are next to each other in the Bayer quad). As discussed, in some examples, the pair of phase autofocus pixels have some distance between them. Furthermore, co-ordinates (e.g., (x,y) as provided herein) refer to phase autofocus pixel plane co-ordinates (e.g., not including imaging pixels).

Accumulated phase difference values 410 may include an accumulated phase difference value for each of multiple phase shifts. For example, the phase shifts may shift PAF images 408 with respect to each other to find a focus phase shift (e.g., a phase shift in pixels with sub-pixel accuracy associated with an estimate of best focus for imaging device 100 and scene 500 based on regions of interest 501, 502 or the like). An individual accumulated phase difference value of accumulated phase difference values 410 may be determined by, for a particular shift, summing, over the region of interest, a plurality of products. For example, each product may be the product of two values. The first value may be a difference between a phase autofocus value (e.g., an intensity value) for a pixel of the left phase autofocus image and a phase autofocus value for a pixel of the right phase autofocus image and the second value may be a threshold determined value. For example, the threshold determined value may be zero or one based on a thresholding of the phase autofocus value for the pixel of the left phase autofocus image and the phase autofocus value for the pixel of the right phase autofocus image. For example, if the minimum and maximum of the phase autofocus values are between minimum and maximum thresholds, the threshold determined value may be one and, if one or both of the phase autofocus values are outside of the thresholds, the threshold determined value may be zero.

Using such techniques, accumulated phase shift difference values may be determined for multiple phase shifts. For example, a phase shift of zero may not apply any shift to the left and right phase autofocus images (e.g., PAF images 408), a phase shift of +2 may shift the right PAF image twice to the right (e.g., two pixels to the right), a phase shift of −7 may shift the right PAF image seven times to the left (e.g., seven pixels to the left), and so on. Any number of accumulated phase difference values 410 may be generated for any number of phase shifts such that the subsequent curve fitting and reliability value generation may provide valid results. In the example graphs of FIGS. 6 and 7 as discussed herein, 11 phase shifts are used (e.g., −5 to +5). In other examples, 15 phase shifts may be used (e.g., −7 to +7). In still other examples, 5, 7, or 9 phase shifts may be used. Furthermore, in some examples, the phase shifts may be centered around a phase shift of 0. In other examples, more left or right phase shifts may be implemented. In some examples, the phase shifts may be associated with offset 206 as discussed herein. As discussed, the phase shifts may differ by an integer value such as 1. In other examples, the phase shifts may differ by a floating point value such that interpolation of the PAF images (e.g., the PAF pixel plane) may be used to provide sub-pixel accurate shifts. In some examples, the interpolation may be a bilinear interpolation.

In some examples, accumulated phase difference values 410 may be denoted as pafdiff(j) such that an accumulated phase difference value is determined for each phase shift, j, where j∈[$j_{min\ shift}$, $j_{max\ shift}$] such as, for example, j∈[−7, +7]. In some examples, there may be multiple versions of accumulated phase difference values 410 (e.g., pafdiff(j)) for different types of phase shifts (e.g., left/right, top/bottom, diagonals, and/or optionally separate accumulated phase difference values for multiple different exposures in case of spatially varying exposure (SVE) sensors). In the following examples, left/right shifts are discussed, however the provided techniques may be expanded to other relationships. For example, accumulated phase difference values 410 (e.g., pafdiff(j)) may be determined as shown in Equations (1):

$$\forall (x, y) \subset ROI, \quad (1)$$
$$pafdiff(j) = \left(\sum_{x,y} a \cdot b_j\right),$$
$$c_{lo} = \min(pafpix_L(x, y), pafpix_R(x + j, y)),$$
$$c_{hi} = \max(pafpix_L(x, y), pafpix_R(x + j, y)),$$
$$\begin{cases} b_j = \mathrm{abs}(pafpix_L(x, y) - pafpix_R(x + j, y)) \\ a = 1, c_{lo} \geq pafdiff_{thr\_lo} \ \& \ c_{hi} \leq pafdiff_{thr\_hi} \\ a = 0, \text{ otherwise} \end{cases}$$

where (x,y) may cover all the pixel coordinates inside the ROI, ROI may be the region of interest, pafdiff(j) may be an accumulated phase difference value at a phase shift j, $pafpix_L$(x,y) may be a phase autofocus value for a left phase autofocus image at (x,y), $pafpix_R$(x+j,y) may be a phase autofocus value for a right phase autofocus image at (x+j,y), $b_j$ may be a difference between the phase autofocus value for the pixel of the left phase autofocus image and the phase autofocus value for the pixel of the right phase autofocus image, $c_{lo}$ may be minimum of the phase autofocus value for a left phase autofocus image at (x,y) and the phase autofocus value for a right phase autofocus image at (x+j,y), $c_{hi}$ may be maximum of the phase autofocus value for a left phase autofocus image at (x,y) and the phase autofocus value for a right phase autofocus image at (x+j,y), a may be a threshold determined value, $pafdiff_{thr\_lo}$ may be a low threshold that may be set according to an estimated noise level or other similar information that indicates the darkest end of a dynamic range is unreliable, and $pafdiff_{thr\_hi}$ may be a high threshold that may be set according to sensor saturation, pixel blooming, and/or other factors that indicated the brightest end of the dynamic range is unreliable. In other examples, both phase pixel components (e.g., $pafpix_L$(x,y) and $pafpix_L$(x,y)) may be rejected if any pixel in local neighborhood of size $k_x \times k_y$ (e.g. 5×5) exceeds the upper threshold, to avoid problems of pixel blooming or other crosstalk. As discussed, in some examples the thresholds are not used at all (e.g., calculation of a and multiplication by a are removed).

As shown in Equations (1), an accumulated phase difference value associated with a particular phase shift may be determined by summing, over the region of interest, a plurality of products, each product comprising the product of a difference between a phase autofocus value for a pixel of the first phase autofocus image and a phase autofocus value for a pixel of the second phase autofocus image and a threshold determined value of zero or one based on a thresholding based on the phase autofocus value for the pixel of the first phase autofocus image and the phase autofocus value for the pixel of the second phase autofocus image. Furthermore, at phase shift of zero, the pixel of the first phase autofocus image and the pixel of the second phase autofocus image comprise a pixel pair of a sensor. For other accumulated phase difference values, the pixel of the second phase autofocus image is shifted by an offset with respect to the pixel of the first phase autofocus image.

Furthermore, as shown in Equations (1), a maximum and minimum of the phase autofocus value for the pixel of the first phase autofocus image and the phase autofocus value for the pixel of the second phase autofocus image may be compared to a low threshold and a high threshold and the threshold determined value may be set to one when the maximum of the phase autofocus value for the pixel of the first phase autofocus image and the phase autofocus value for the pixel of the second phase autofocus image is not greater than the high threshold and the minimum of the phase autofocus value for the pixel of the first phase autofocus image and the phase autofocus value for the pixel of the second phase autofocus image is not less than the low threshold. Otherwise (e.g., when one or both of the minimum and maximum less than and/or greater than the pertinent threshold), the threshold determined value may be set to zero.

In other examples, an accumulated phase difference value associated with a particular phase shift may be determined by summing, over the region of interest, a plurality of products, each product comprising the product of a difference between a phase autofocus value for a pixel of the first phase autofocus image and a phase autofocus value for a pixel of the second phase autofocus image and a threshold determined value of zero or one based on a thresholding of the difference between the phase autofocus value for the pixel of the first phase autofocus image and the phase autofocus value for the pixel of the second phase autofocus image. Furthermore, at phase shift of zero, the pixel of the first phase autofocus image and the pixel of the second phase autofocus image comprise a pixel pair of a sensor. For other accumulated phase difference values, the pixel of the second phase autofocus image is shifted by an offset with respect to the pixel of the first phase autofocus image. In such examples, the difference between the phase autofocus value for the pixel of the first phase autofocus image and the phase autofocus value for the pixel of the second phase autofocus image may be compared to a low threshold and a high threshold and the threshold determined value may be set to one when the difference between the phase autofocus value for the pixel of the first phase autofocus image and the phase autofocus value for the pixel of the second phase autofocus image is between the low and high thresholds and the threshold determined value may be set to zero when the difference between the phase autofocus value for the pixel of the first phase autofocus image and the phase autofocus value for the pixel of the second phase autofocus image is not between the low and high threshold.

As discussed, the phase shift or offset, j, may be integer value or it may be a floating point value in which case interpolation of the PAF pixel plane (e.g. bilinear interpolation) may be used to enable sub-pixel accurate shifts or offsets. Similarly, phase shift or offset, j, may be 1 (as in the example) or any other integer value.

As shown with respect to Equations (1), in some examples, some difference values, e.g., $b_j$, may be rejected via thresholding (e.g., via thresholds $pafdiff_{thr\_lo}$ to and $pafdiff_{thr\_hi}$) such that threshold determined value, a, is zero. In such examples, rejected phase autofocus pixel pairs (or, alternatively, accepted phase autofocus pixel pairs when a is one)

may be counted and stored in memory for each accumulated phase difference value and the pertinent accumulated difference values (e.g., all pafdiff(j) for each ROI) may be normalized by the number of phase autofocus pixel pairs used to calculate them. Such normalization may eliminate potential bias in accumulated phase difference values 410 based on rejected pixel pairs for example. Furthermore, in other examples, no thresholding may be performed (e.g. threshold determined value, a, and thresholds pafdiff$_{thr\_lo}$ and pafdiff$_{thr\_hi}$ may not be implemented). In such examples, the summation illustrated in Equations (1) may sum $b_j$ values (e.g., such that pafdiff(j)=SUM$_{x,y}(b_j)$). In such examples, the reliability around pixel pairs based on brightness may be estimated based on a low resolution representation of the raw image (e.g., using a regular 3A statistics grid) and applied to the reliability value via focus phase shift reliability module 405, as is discussed further herein.

As shown in FIG. 4, accumulated phase difference values 410 may be transferred from accumulated phase difference module 402 to curve fitting module 403 and/or to a memory of imaging device 100. Curve fitting module 403 may receive accumulated phase difference values 410 from accumulated phase difference module 402 or memory and curve fitting module 403 may perform a curve fitting based on accumulated phase difference values 410 and the associated phase shifts to generate a fitted curve (FC) 411 such as an accumulated phase difference fitted curve. For example, the values of pafdiff(j), j∈[j$_{min\ shift}$, j$_{max\ shift}$], may form a curve pafdiff_f(x) when a curve is fitted on those data points.

In some examples, fitted curve 411 may be generated by determining a global minimum of the plurality of accumulated phase difference values 410, fitting a curved function such as a quadratic function to the global minimum, an accumulated phase difference value shift adjacent to the left of the global minimum, and an accumulated phase difference value shift adjacent to the right of the global minimum, fitting linear functions between the remaining accumulated phase difference values, and generating fitted curve 411 by combining the curved function and the linear functions.

Figure 6:
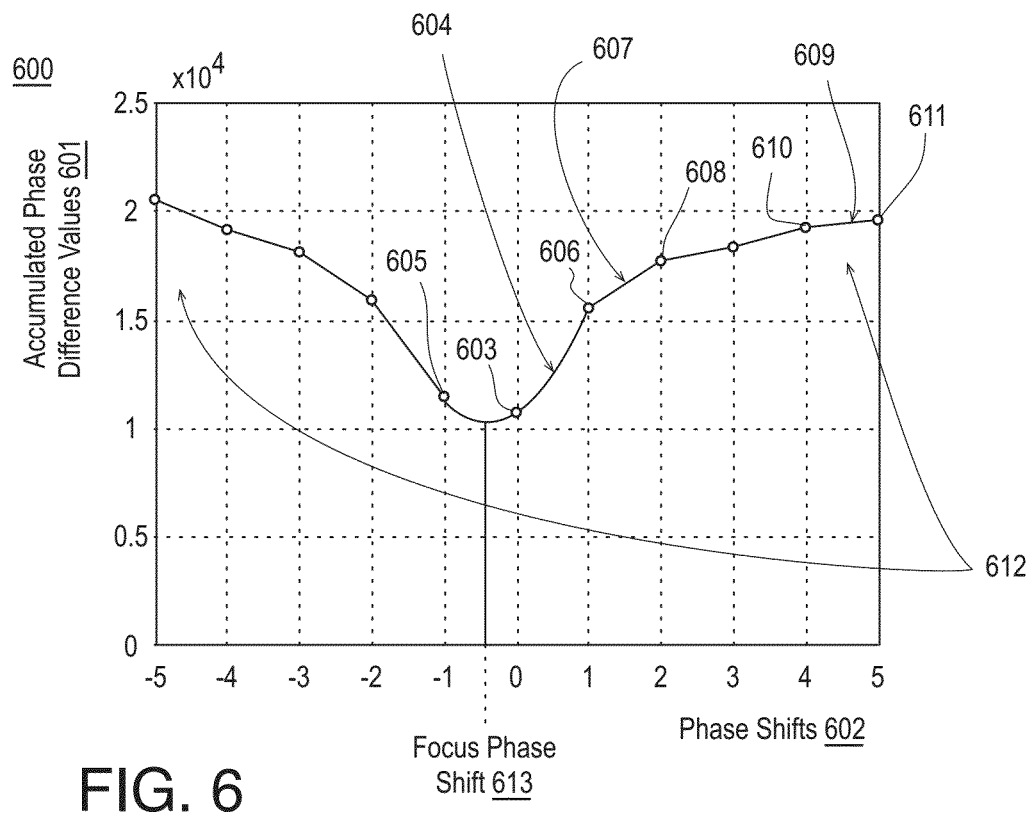
FIG. 6 illustrates an example graph of example accumulated phase difference values and example phase shifts.

FIG. 6 illustrates an example graph 600 of example accumulated phase difference values 601 and example phase shifts 602, arranged in accordance with at least some implementations of the present disclosure. As shown in FIG. 6, a global minimum 603 may be determined as the minimum value of accumulated phase difference values 601. For example, global minimum 603 may be determined as shown in Equation (2):

$$j_{gmin} = \underset{j}{\operatorname{argmin}}(pafdiff(j)) \qquad (2)$$

where j$_{gmin}$ may be the global minimum (e.g., the phase shift associated with the global minimum of accumulated phase difference values 601) and argmin may provide a minimum of patdiff(j) over j.

Furthermore, FIG. 6 illustrates a curved function 604 may be fitted to global minimum 603, an accumulated phase difference value 605, and an accumulated phase difference value 606. As shown, accumulated phase difference value 605 may be shift adjacent to global minimum such that it is one phase shift (e.g., −1) away from global minimum 603 and accumulated phase difference value 606 may be shift adjacent to global minimum such that it is one phase shift (e.g., +1) away from global minimum 603. As shown, curved function 604 may extend from accumulated phase difference value 605 to accumulated phase difference value 606. In the illustrated example, curved function extends through global minimum 603; however, in other examples, curved function 604 may not extend through global minimum 603. For example, curved function 604 may be a quadratic function fit to patdiff (j$_{gmin}$−1), patdiff(j$_{gmin}$), and patdiff(j$_{gmin}$+1).

Also as shown, linear functions (such as labeled linear functions 607, 609; not all linear functions are labeled for the sake of clarity) may be fit between accumulated phase difference value 605 and accumulated phase difference value 606 and remaining accumulated phase difference values. For example, linear function 607 may be fit between accumulated phase difference value 606 and accumulated phase difference value 608, linear function 609 may be fit between accumulated phase difference value 610 and accumulated phase difference value 611. As shown, curved function 604 and the linear functions (such as linear functions 607, 609) may be combined to generate an accumulated phase difference values fitted curve 612. Although discussed with respect to quadratic functions for curved function 604 fit to global minimum 603, accumulated phase difference value 605, and accumulated phase difference value 606 and linear functions for other accumulated phase difference values, other suitable fitting functions may be used.

FIG. 6 also illustrates a focus phase shift 613 (e.g., a phase shift measured in pixels with sub-pixel accuracy determined to bring the camera into focus). In some examples, focus phase shift 613 may be determined as a minimum of accumulated phase difference values fitted curve 612. For example, focus phase shift 613 may be determined as shown in Equation (3):

$$\text{pafdiff}_{MIN} = \operatorname{argmin}_x(\text{pafdiff\_}f(x)) \qquad (3)$$

where pafdiff$_{MIN}$ may be the minimum of accumulated phase difference values fitted curve 612, and argmin may provide a minimum of pafdiff_f(x) over x, and, as discussed, patdiff_f(x) may provide accumulated phase difference values fitted curve 612. In the illustrated example of FIG. 6, focus phase shift 613 may be about −0.4 pixels.

Figure 7:
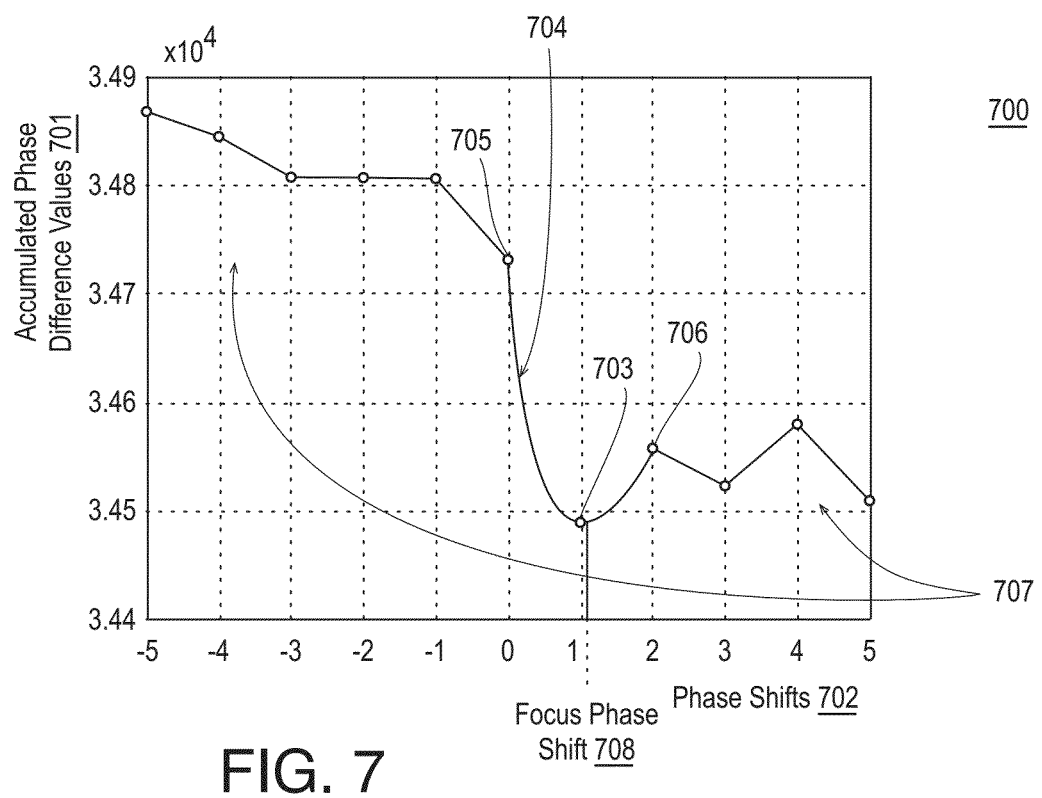
FIG. 7 illustrates an example graph of example accumulated phase difference values and example phase shifts.

FIG. 7 illustrates an example graph 700 of example accumulated phase difference values 701 and example phase shifts 702, arranged in accordance with at least some implementations of the present disclosure. As shown in FIG. 7, global minimum 703 may be determined as the minimum value of accumulated phase difference values 702. For example, global minimum 703 may be determined as discussed herein. For example, global minimum 703 may be determined a shown in Equation (2) above. FIG. 6 also illustrates a curved function 704 may be fitted to global minimum 703, an accumulated phase difference value 705, and an accumulated phase difference value 706. As shown, accumulated phase difference value 705 may be shift adjacent to global minimum such that it is one phase shift (e.g., −1) away from global minimum 703 and accumulated phase difference value 706 may be shift adjacent to global minimum such that it is one phase shift (e.g., +1) away from global minimum 603. As shown, curved function 704 may extend from accumulated phase difference value 705 to accumulated phase difference value 706. As discussed with respect to curved function 604, curved function 704 may be a quadratic function fit to patdiff (j$_{gmin}$−1), patdiff(j$_{gmin}$), and patdiff(j$_{gmin}$+1).

Also as shown, linear functions (not labeled) may be fit between accumulated phase difference value 705 and accumulated phase difference value 706 and remaining accumulated phase difference values 701. For example, linear functions may be fit between accumulated phase difference value 705 and accumulated phase difference value 706 and remaining accumulated phase difference values 701 using techniques as discussed herein with respect to FIG. 6. As shown, curved function 704 and the linear functions may be combined to generate an accumulated phase difference values fitted curve 707. FIG. 7 also illustrates a focus phase shift 708. As discussed with respect to focus phase shift 613, focus phase shift 708 may be determined as a minimum of accumulated phase difference values fitted curve 707. For example, focus phase shift 708 may be determined as shown in Equation (3) above. In the illustrated example, focus phase shift 708 may be about +1.05 pixels.

Returning to FIG. 4, curve fitting module 403 may transfer fitted curve 411 (e.g., an accumulated phase difference values fitted curve) to focus phase shift module 404, focus phase shift reliability module 405, and/or a memory of imaging device 100. Curving fitting module 403 may transfer 411 using any suitable techniques such as by providing coefficients associated with the curved function and linear functions, data indicating the types of functions implemented, data indicating a number of shifts, and the like. Focus phase shift module 404 may receive fitted curve 411 from curve fitting module 403 or memory and focus phase shift module 404 may determine a focus phase shift (FPS) 412 based on fitted curve 411. For example, as discussed, fitted curve 411 may include one or more functions fitted to accumulated phase difference values 410 and the associated phase shifts (e.g., as shown with respect to FIGS. 6 and 7). The functions may include a quadratic function and linear functions or the like.

Focus phase shift module 404 may determine focus phase shift 412 using any suitable technique or techniques such as determining a minimum of fitted curve 411 as discussed herein. FIGS. 6 and 7 illustrate example minimums of fitted curves (e.g., focus phase shift 613 of fitted curve 612 and focus phase shift 708 fitted curve 707, respectively). In some examples, focus phase shift 412 of fitted curve 411 may be determined based on Equation (3) discussed above. Focus phase shift module 404 may transfer focus phase shift 412 to image processing and autofocus module 401 and/or a memory of imaging device 100.

As shown in FIG. 4, focus phase shift reliability module 405 (which also may be characterized as a confidence module or the like) may receive fitted curve 411 from curve fitting module 403 or memory and focus phase shift reliability module 405 may generate a reliability value (RV) 413. For example, focus phase shift reliability module 405 may estimate or determine a confidence or reliability of focus phase shift 412 (e.g., the phase difference information estimated to provide focus) by analyzing fitted curve 411 (e.g., the fitted curve that results from generating an accumulated phase difference values for different amounts of phase shift and fitting a curve on that data). In some examples, focus phase shift reliability module 405 may also receive signal-to-noise ratio data 414 from image processing and autofocus module 401 or memory and focus phase shift reliability module 405 may generate reliability value 413 based on fitted curve 411 and signal-to-noise ratio data 414. Also, in some examples, focus phase shift reliability module 405 may generate or receive data or a measure of reliability based brightness around pixel pairs in the region of interest. In other examples, focus phase shift reliability module 405 may generate reliability value 413 only based on fitted curve 411.

Focus phase shift reliability module 404 may determine reliability value 413 using any suitable technique or techniques. In some examples, focus phase shift reliability module 405 may generate reliability value 413 associated with focus phase shift 412 for accumulated phase difference values 410 based on accumulated phase difference values fitted curve 411. In some examples, reliability value 413 may be generated by determining one or more measures associated with accumulated phase difference values fitted curve 411 and one or more weights associated with the measures, and generating reliability value 413 based on the one or more measures and the one or more weights. For example, reliability value 413 may be generated by determining a value for each of the measures and weights, the value comprising one minus the weight plus a product of the weight and the measure, and taking a product over the plurality of generated values to determine reliability value 413. In some examples, focus phase shift reliability module 405 may determine reliability value 413 as shown in Equation (4):

$$\text{pafdiff}_{CONF} = \Pi_{i=0}^{n}((1-c_i)+c_i*m_i) \qquad (4)$$

where $\text{pafdiff}_{CONF}$ may be the reliability value, i may be a counter variable, n may be the number of measures and associated weights used, c may be weights, and m may be measures. For example, weights, c, may be relative weights in the range of [0:1] implementing a relative contribution of measure, m, to reliability value 413. Furthermore, in some examples, measures, m, may also be in the range of [0:1], although any suitable range may be used. In some examples, reliability value 413 may be in a range between 0 and 1 such that a value of 0 indicates focus phase shift 412 is completely reliable and a value of 1 indicates full confidence in focus phase shift 412. In some examples, weights, c, may be predetermined weights. In some examples, weights, c, may be predetermined based on a priori knowledge of their effects on the reliability value.

As discussed, one or more measures and associated weights may be used to determine reliability value 413. In an embodiment, five measurements, as discussed below, and associated weights may be used. In such an example, Equation (4) may be re-written as shown in Equation (5):

$$\text{pafdiff}_{CONF}=((1-c_{RANGE})+c_{RANGE}*m_{RANGE})*((1-c_{DSC})+c_{DSC}*m_{DSC})*((1-c_{SYMM})+c_{SYMM}*m_{SYMM})*((1-c_{SoP})+c_{SoP}*m_{SoP})*((1-c_{SNR})+c_{SNR}*m_{SNR}), \qquad (5)$$

where $c_{RANGE}$ may be a weight associated with $m_{RANGE}$, $m_{RANGE}$ may be a measure of the dynamic range of fitted curve 411 as is discussed further below, $c_{SC}$ may be a weight associated with $m_{DSC}$, $m_{DSC}$ may be a measure of the number of sign changes of the derivative of fitted curve 411 as is discussed further below, $c_{SYMM}$ may be a weight associated with $m_{SYMM}$, $m_{SYMM}$ may be a measure of symmetry between a left side and a right side of fitted curve 411 as is discussed further below, $c_{SoP}$ may be a weight associated with $m_{SoP}$, $m_{SoP}$ may be a sharpness measure for the valley residing at the global minimum of fitted curve 411 as is discussed further below, $c_{SNR}$ may be a weight associated with $m_{SNR}$, and $m_{SNR}$ may be a measure of the signal-to-noise ratio in region of interest 409 (e.g., based on signal-to-noise ratio data 414).

As discussed, in some examples, a measure of the dynamic range of fitted curve 411 (and an associated weight) may be used to determine reliability value 413. Any suitable measure of dynamic range may be used. In some examples, the dynamic range may be determined as shown in Equations (6):

$$\text{pafdiff}_{MAX\_R} = \max(\text{pafdiff\_f}(x)), x \in [j_{gmin}, j_{maxshift}] \qquad (6)$$

$$\text{pafdiff}_{MAX\_L} = \max(\text{pafdiff\_f}(x)), x \in [j_{minshift}, j_{gmin}]$$

$$m_{RANGE} = K_{range} *$$

-continued
$$\frac{(pafdiff_{MAX\_R} - pafdiff_{MIN})^2 + (pafdiff_{MAX\_L} - pafdiff_{MIN})^2}{(pafdiff_{MAX\_R})^2 + (pafdiff_{MAX\_L})^2}$$

where $m_{RANGE}$ may be the measure of the dynamic range, $K_{range}$ may be the dynamic range gain (e.g., a predetermined value), paf diff$_{MAX\_R}$ may be a right side maximum of fitted curve 411, paf diff$_{MAX\_L}$ may be a left side maximum of fitted curve 411, patdiff_f(x) may be fitted curve 411 over x, $j_{gmin}$ may be the global minimum, $j_{max\ shift}$ may be a maximum shift (e.g., furthest shift to the right), $j_{min\ shift}$ may be a minimum shift (e.g., furthest shift to the left), and paf diff$_{MIN}$ may be the minimum of fitted curve 411 as discussed above with respect to Equation (3). As discussed, $K_{range}$ may be a predetermine dynamic range gain. $K_{range}$ may be any suitable value such as a value in the range of 2 to 6 or the like. In an embodiment, $K_{range}$ is 4.

As discussed, in some examples, a measure of the number of sign changes of the derivative of fitted curve 411 (and an associated weight) may be used to determine reliability value 413. For example, fitted curves having a jagged or up-and-down shape may provide unreliable focus phase shifts as it is unclear which match is associated with best focus. Any suitable technique or techniques may be used to measure of the number of sign changes of the derivative of fitted curve 411. In some examples, a derivative of fitted curve may be determined (e.g., d/dx(patdiff_f(x))) and the number of sign changes of the derivative may be counted.

As discussed, in some examples, a measure of symmetry between a left side and a right side of fitted curve 411 (and an associated weight) may be used to determine reliability value 413. Any suitable measure of the symmetry of fitted curve 411 may be used. In some examples, the symmetry measurement may be determined as shown in Equations (7):

$$m_{SYMM} = \min\left(1, K_{symm} * \frac{\min\left(\sum_{j=j_{gmin}}^{j_{gmin}+s} pafdiff(j), \sum_{j=j_{gmin}}^{j_{gmin}-s} pafdiff(j)\right)}{\max\left(\sum_{j=j_{gmin}}^{j_{gmin}+s} pafdiff(j), \sum_{j=j_{gmin}}^{j_{gmin}-s} pafdiff(j)\right)}\right) \quad (7)$$

where $m_{SYMM}$ may be the measure of symmetry, s may be the number of steps (e.g., typically about 3 or 4) away from both sides of the minimum of fitted curve 411 used to determine the measure of symmetry, and $K_{symm}$ may be a gain for the symmetry measurement. $K_{symm}$ may be any suitable gain value. For example, $K_{symm}$ may be in the range of about 1 to 2. In an embodiment, $K_{symm}$ is 1.33. For example, for a fully symmetric fitted curve 411, $m_{SYMM}$ has a value of 1 and, as fitted curve 411 becomes more asymmetrical, $m_{SYMM}$ approaches 0.

As discussed, in some examples, a sharpness measure for the valley residing at the global minimum of fitted curve 411 (and an associated weight) may be used to determine reliability value 413. For example, a substantial V-shape may provide more reliable estimates of focus phase shift than flatter shapes. Any suitable sharpness measure for the valley residing at the global minimum of fitted curve 411 may be used. In some examples, the sharpness measurement may be determined as shown in Equations (8):

$$m_{SoP} = \min\left(1, K_{SoP} * \frac{\max(pafdiff\_f(pafdiff_{MIN} - step_{SoP}),}{\max(pafdiff_{MAX\_R}, pafdiff_{MAX\_L}) - pafdiff_{MIN}}\right) \quad (8)$$

where $m_{SoP}$ may be the sharpness measurement, $step_{SoP}$ may be a phase shift step from the minimum position of paf diff$_{MIN}$, and $K_{SoP}$ may be a gain for the sharpness measurement. $K_{SoP}$ may be any suitable gain value. For example, $K_{SoP}$ may be in the range of about 5 to 9. In an embodiment, $K_{SoP}$ is 7. For example, sharp and pronounced peaks may provide a sharpness measurement approaching 1 and shallow or flat peaks may provide a sharpness measurement approaching 0.

Furthermore, in some examples, a measurement of a signal-to-noise ratio, $m_{SNR}$, of region of interest 409 (and an associated weight, $c_{SNR}$) may be used to determine reliability value 413. In some examples, the measurement of the signal-to-noise ratio of region of interest 409 may be received from image processing and autofocus module 401. In other examples, raw data associated with the signal-to-noise ratio of region of interest 409 may be received from image processing and autofocus module 401 and focus phase shift reliability module 405 may determine the measurement of a signal-to-noise ratio of region of interest 409. In some examples, the signal-to-noise ratio may be normalized or provided a gain or the like such that it is in the range of about 0 to 1. In some examples, the signal-to-noise ratio measurement may be associated with, for region of interest 409) an analog gain, lens shading correction (LSC) gain, a digital gain, an on-sensor gain, other gains, or signal levels, or the like.

Also, as discussed with respect to Equation (1), in some examples, no thresholding may be performed (e.g. threshold determined value, a, and thresholds pafdiff$_{thr\_lo}$ and pafdiff$_{thr\_hi}$ may not be implemented) and the above described summation shown in Equations (1) may sum $b_j$ values (e.g., such that pafdiff(j)=SUM$_{x,y}$($b_j$)). In such examples, the reliability around pixel pairs based on brightness may be estimated based on a low resolution representation or version of the raw image (e.g., using a regular 3A statistics grid) and applied to the reliability value via focus phase shift reliability module 405, as is discussed further herein. In some examples, focus phase shift reliability module 405 may add an additional terms or terms such as a measurement and a weight associated with a reliability based on brightness of the areas around pixel pairs (e.g., an average measurement or the like). For example, a measure, $m_{rel\_brightness}$, and an associated weight, $c_{rel\_brightness}$ may be implemented via Equation (4) such that $m_{rel\_brightness}$ may be a measure of reliability based on brightness (such as an average reliability based on brightness for the region of interest or other measure) and $c_{rel\_brightness}$ may be an associated weight. In some examples, focus phase shift reliability module 405 may receive the measure of reliability based on brightness from image processing and autofocus module 401 and, in other examples, focus phase shift reliability module 405 may determine the measure of reliability based on brightness based on PAF images 408 or the like.

Weights, c, may be any suitable values to modify the relative contributions of measurements, m. In some examples, weight $c_{DSC}$ (e.g., the weight associated with $m_{DSC}$, a measure of the number of sign changes of the derivative of the fitted curve) may carry the greatest weight, weight $c_{RANGE}$ (e.g., the weight associated with $m_{RANGE}$, a measure of the dynamic range of the fitted curve) may carry the second greatest weight, and any other measurements used may carry lesser weights. As discussed, the weights may be modified to change the relative priority of the measurements associated with the weights.

As discussed, one or more measurements associated with a fitted curve fitted to accumulated phase difference values may be used to determine a reliability value associated with a focus phase shift. For example, FIG. 6 illustrates an example accumulated phase difference values fitted curve 612 that may provide a substantially high reliability value while FIG. 7 illustrates an example accumulated phase difference values fitted curve 707 that may provide a substantially low reliability value. For example, as shown, fitted curve 612 may provide greater symmetry as compared to fitted curve 707, the derivative of fitted curve 612 may provide fewer sign changes than the derivative of fitted curve 707 (e.g., the right side of fitted curve 707 may change between positive and negative slope at several points), and fitted curve 612 may provide a greater dynamic ranges as compared to fitted curve 707 (e.g., fitted curve 612 has a maximum of about $2.1 \times 10^4$ and a minimum of about $1.05 \times 10^4$ for a difference of about $1.05 \times 10^4$ and fitted curve 707 has a maximum of about $3.486 \times 10^4$ and a minimum of about $3.449 \times 10^4$ for a difference of about $0.037 \times 10^4$). Furthermore, the sharpness of the valley around focus phase shifts 613 may be greater than the sharpness of the valley around focus phase shifts 707 (e.g., again note the difference in scale between FIGS. 6 and 7). Therefore, the resultant reliability value associated with focus phase shift 613 may be substantially greater than the resultant reliability value associated with focus phase shift 613.

As discussed, a reliability value associated with a focus phase shift may be determined based on a fitted curve. For example, such a reliability value may be generated without edge detection, variance or similar techniques that may be computationally intensive and potentially slow. For example, edge detection, variance, or similar techniques may separate flat image areas from areas that have edge or texture information and phase autofocus may be deemed unreliable in flat image areas; however, as discussed such techniques may slow and unreliable for some images.

Returning to FIG. 4, as shown, image processing and autofocus module 401 may receive focus phase shift 412 and reliability value 413 focus phase shift module 404 and focus phase shift reliability module 405, respectively, or from a memory of imaging device 100. Image processing and autofocus module 401 may determine autofocus (AF) data 415 based on focus phase shift 412 and reliability value 413. For example autofocus data 415 may include a lens position shift, an updated lens position, or a number of lens motor units for driving lens or the like. In an example, a number of lens motor units may be determined based on focus phase shift via a look up table implemented via image processing and autofocus module 401. For example, image processing and autofocus module 401 may provide autofocus data 415 to focus driver 406, which may focus imaging device 100 by adjusting a lens position of imaging device 100 or the like.

As discussed, image processing and autofocus module 401 may determine autofocus data 415 based on focus phase shift 412 and reliability value 413. For example, image processing and autofocus module 401 may provide autofocus data 415 based on or equivalent to focus phase shift 412 when reliability value 413 is high. For example, reliability value 413 may be compared to a threshold and based on the comparison, image processing and autofocus module 401 may provide autofocus data 415 based on or equivalent to focus phase shift 412. For example, if reliability value 413 is greater than the threshold, autofocus data 415 may be based on or equivalent to focus phase shift 412. The threshold may be any suitable threshold such as a predetermined threshold or a heuristically determined threshold or the like. In examples, where reliability value is in the range of 0 to 1, the threshold may be 0.3, 0.5, 0.6, or 0.8, or the like. If reliability value 413 is less than the threshold (or less than and equal to the threshold), image processing and autofocus module 401 may perform autofocus based on contrast based autofocus. For example, image processing and autofocus module 401 may generate autofocus data 415 based on implementation of contrast based autofocus via a contrast based autofocus module (not shown) or the like.

In some examples, more than one region of interest of a scene may be implemented. In such examples, multiple focus phase shifts and multiple associated reliability values may be generated. In an example, reliability values for different regions of interest may be compared and image processing and autofocus module 401 may determine autofocus data 415 based on or equivalent to the focus phase shift associated with the region of interest having the greatest reliability value or a reliability value above a threshold or the like. In an example, autofocus data 415 may be an average of focus phase shifts associated with reliability values above a threshold.

As discussed, in some examples, a threshold may be used to determine, via image processing and autofocus module 401, whether to use focus phase shift 412 or contrast based autofocus or the like. In other examples, multiple thresholds or elements may be used to make such a determination. For example, a distribution of the measures discussed herein may be evaluated based on a weighting decision or the like to make such a determination. Furthermore, in some examples, image processing and autofocus module 401 may determine whether to use focus phase shift 412 or contrast based autofocus. In other examples, image processing and autofocus module 401 may, based on reliability value 413 and/or the measurements discussed herein, modify focus phase shift 412. For example, if reliability value 413 is relatively low, focus phase shift value 412 may be reduced and the discussed techniques may be performed again from the new lens position. For example, if reliability value 413 is relatively low, a step size of a lens movement in one autofocus iteration may be reduced. For example, if a high or relatively high reliability would lead to moving a lens by X units, a relatively low reliability may lead to moving the lens by only part of X.

The techniques discussed herein may allow, in some examples, for hybrid phase and contrast based autofocus. Furthermore, the techniques discussed herein may provide improved image quality and improved video quality in imaging devices.

FIG. 8 is a flow diagram illustrating an example process 800 for providing autofocus, arranged in accordance with at least some implementations of the present disclosure. Process 800 may include one or more operations 801-804 as illustrated in FIG. 8. Process 800 may form at least part of an autofocus process. By way of non-limiting example, process 800 may form at least part of an autofocus process for imaging device 100 as discussed herein. Furthermore, process 800 will be described herein with reference to system 900 of FIG. 9.

Figure 9:
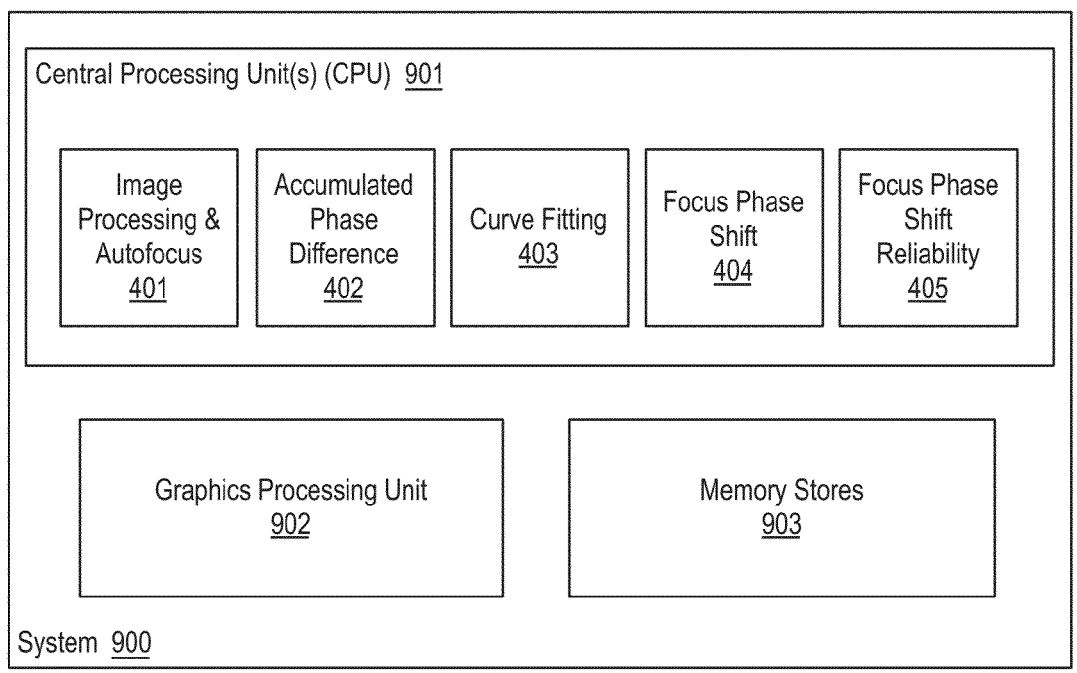
FIG. 9 is an illustrative diagram of an example system for providing autofocus.

FIG. 9 is an illustrative diagram of an example system 900 for providing autofocus, arranged in accordance with at least some implementations of the present disclosure. As shown in FIG. 9, system 900 may include one or more central processing units (CPU) 901, a graphics processing unit (GPU) 902, and memory stores 903. Also as shown, CPU 901 may include image processing and autofocus module 401, accumulated phase difference module 402, curve fitting module 403, focus phase shift module 404, and focus phase shift reliability module 405. In the example of system 900, memory stores 903 may store image content such as captured images (or image frames) (e.g., images or phase autofocus images) or image related data such as image data generated via an imaging pipeline and/or system or modules such as measurements and weights, focus phase shifts, reliability values, accumulated phase differences, region of interest data, fitted curve data, signal-to-noise ratio data, or other data as discussed herein.

As shown, in some examples, image processing and autofocus module 401, accumulated phase difference module 402, curve fitting module 403, focus phase shift module 404, and focus phase shift reliability module 405 may be implemented via central processing units 901. In other examples, one or more of image processing and autofocus module 401, accumulated phase difference module 402, curve fitting module 403, focus phase shift module 404, and focus phase shift reliability module 405 may be implemented via graphics processing unit 902. In other examples, one or more of image processing and autofocus module 401, accumulated phase difference module 402, curve fitting module 403, focus phase shift module 404, and focus phase shift reliability module 405 may be implemented via an imaging pipeline and/or image signal processor or the like. Furthermore, system 800 may include sensor 200, focus driver 406, or any other module or device as discussed herein implemented via central processing units 901 and/or graphics processing units 902.

Graphics processing unit 902 may include any number and type of graphics processing units that may provide the operations as discussed herein. Such operations may be implemented via software or hardware or a combination thereof. For example, graphics processing unit 902 may include circuitry dedicated to manipulate images obtained from memory stores 903. Central processing units 901 may include any number and type of processing units or modules that may provide control and other high level functions for system 900 and/or provide any operations as discussed herein. Memory stores 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 903 may be implemented by cache memory. In an embodiment, one or more of image processing and autofocus module 401, accumulated phase difference module 402, curve fitting module 403, focus phase shift module 404, and focus phase shift reliability module 405 (or other modules discussed herein) may be implemented via an execution unit (EU) of graphics processing unit 902. The EU may include, for example, programmable logic or circuitry such as a logic core or cores that may provide a wide array of programmable logic functions. In an embodiment, one or more of image processing and autofocus module 401, accumulated phase difference module 402, curve fitting module 403, focus phase shift module 404, and focus phase shift reliability module 405 (or other modules discussed herein) may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 may begin at operation 801, "Determine, for a Region of Interest of a Scene, Accumulated Phase Difference Values associated with Phase Shifts for Phase Autofocus Images Determine, for a Region of Interest of a Scene, Accumulated Phase Difference Values associated with Phase Shifts for Phase Autofocus Images", where, for a region of interest of a scene, a plurality of accumulated phase difference values associated with a plurality of phase shifts may be determined for a first phase autofocus image and a second phase autofocus image. For example, accumulated phase difference module 402 as implemented via CPU 901 or other circuitry may determine accumulated phase difference values 410, 601, or 701 for associated phase shifts such as phase shifts 602, 702 based on phase autofocus images 408 (e.g., as attained via sensor 200). For example, the accumulated phase difference values may be determined based on Equations (1) as discussed herein.

Processing may continue at operation 802, "Perform a Curve Fitting based on the Accumulated Phase Difference Values and Phase Shifts to Generate an Accumulated Phase Difference Values Fitted Curve", where a curve fitting may be performed based on the plurality of accumulated phase difference values and the plurality of phase shifts to generate an accumulated phase difference values fitted curve. For example, curve fitting module 403 as implemented via CPU 901 or other circuitry may perform a curve fitting based on accumulated phase difference values 410, 601, or 701 and the associated phase shifts to generate accumulated phase difference values fitted curve 411, 612, or 707. For example, curve fitting module 403 may generate the fitted curve by determining a global minimum of the accumulated phase difference values, fitting a function such as a quadratic function to the global minimum and two adjacent accumulated phase difference values (e.g., one on each side of the global minimum), fitting linear functions to remaining accumulated phase difference values, and generating the accumulated phase difference values fitted curve based on the curved function and the linear functions (e.g., by combining them).

Processing may continue at operation 803, "Generate a Reliability value associated with a Focus Phase Shift For based on the Accumulated Phase Difference Values Fitted Curve", where a reliability value associated with a focus phase shift for the plurality of accumulated phase difference values and the plurality of phase shifts may be generated based at least in part on the accumulated phase difference values fitted curve. For example, focus phase shift module 404 as implemented via CPU 901 or other circuitry may generate a focus phase shift such as focus phase shift 412, 613, or 708 as a minimum of the accumulated phase difference values fitted curve. Furthermore, for example, focus phase shift reliability module 405 as implemented via CPU 901 or other circuitry may generate reliability value 413 based on the values fitted curve by determining measures associated with the accumulated phase difference values fitted curve and weights measures and determining reliability value 413 as discussed with respect to Equation (4) above. For example, the measures may include a measure of a dynamic range of the accumulated phase difference values fitted curve, a measure of sign changes of the accumulated phase difference values fitted curve, a measure of a symmetry of the accumulated phase difference values fitted curve, a measure of a sharpness of a valley around a global minimum of the plurality of accumulated phase difference values, or a measure of a signal-to-noise ratio of the region of interest.

Processing may continue at operation 804, "Focus an Imaging Device based in part on the Reliability Value", where the imaging device may provide focus based at least in part on the reliability value. For example, the image device may provide focus based on the focus phase shift and the reliability value as discussed herein. For example, image processing and autofocus module 401 as implemented via CPU 901 or other circuitry may determine whether to use phase autofocus (e.g., when reliability value 413 or associated measures indicate high reliability) based on a focus phase shift such as focus phase shift 412, 613, or 708 or to use contrast based autofocus (e.g., when reliability value 413 or associated measures indicate low reliability) or other focusing techniques as discussed herein. When imaging device 100 uses phase autofocus, the focusing may be based on focus phase shift 412, 613, or 708, or the like such that a lens position or movement may be determined based on the focus phase shift as discussed herein. In some examples, system 900 may implement autofocus data provided by image processing and autofocus module 401 via focus driver 406 as discussed herein Process 800 may be repeated any number of times either in series or in parallel for any number of exposures implemented via a user of imaging device 100. Furthermore, process 800 may be repeated any number of times during a single exposure implemented via a user of imaging device 100. For example, after providing autofocus based on process 800, imaging device 100 may repeat process 800 from the new lens position to attain even better focus or as the scene or objects therein may have changed. For example, such processes may be performed substantially continuously until a user has taken the exposure. As discussed, process 800 may provide a reliability value associated with a phase autofocus shift (e.g., a focus phase shift, a phase shift measured in pixels with sub-pixel accuracy to bring the camera into focus) such that, for exposures with high reliability values, faster phase autofocus may be implemented and, for exposures with low reliability values, contrast based autofocus may be used. Such hybrid autofocus may provide for improved autofocus capabilities for users of imaging device 100.

Various components of the systems described herein may be implemented in software, firmware, and/or hardware and/ or any combination thereof. For example, various components of imaging device 100, system 400, system 1000, or device 1100 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of imaging device 100, system 400, system 1000, or device 1100, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
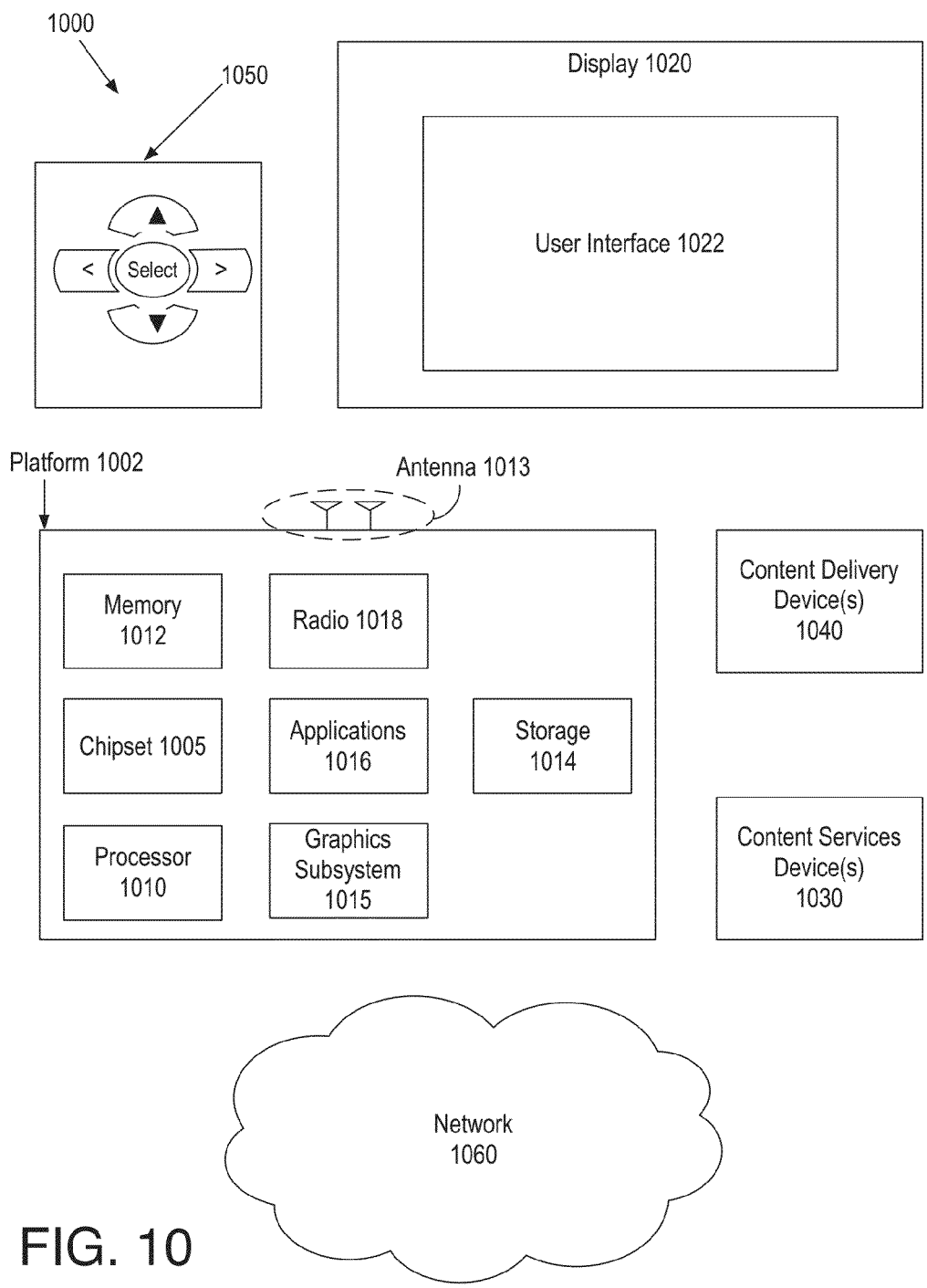
FIG. 10 is an illustrative diagram of an example system.

FIG. 10 is an illustrative diagram of an example system 1000, arranged in accordance with at least some implementations of the present disclosure. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
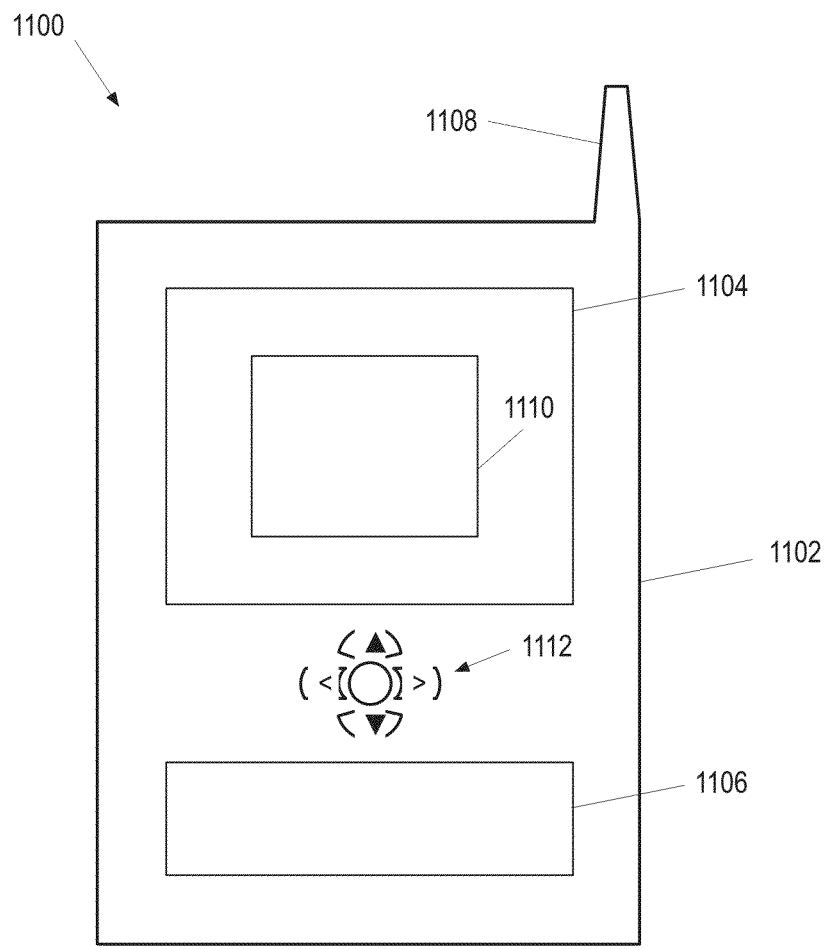
FIG. 11 illustrates an example device, all arranged in accordance with at least some implementations of the present disclosure.

As described above, system 1000 may be embodied in varying physical styles or form factors. FIG. 11 illustrates implementations of a small form factor device 1100 in which system 1000 may be embodied. In various embodiments, for example, device 1100 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for providing autofocus for an imaging device comprises determining, for a region of interest of a scene, a plurality of accumulated phase difference values associated with a plurality of phase shifts for a first phase autofocus image and a second phase autofocus image, performing a curve fitting based on the plurality of accumulated phase difference values and the plurality of phase shifts to generate an accumulated phase difference values fitted curve, generating a reliability value associated with a focus phase shift for the plurality of accumulated phase difference values and the plurality of phase shifts based at least in part on the accumulated phase difference values fitted curve, and focusing the imaging device based at least in part on the reliability value.

Further to the first embodiments, the method further comprises obtaining the first phase autofocus image and the second phase autofocus image via a sensor having a plurality of pairs of phase autofocus pixel sensors.

Further to the first embodiments, the method further comprises obtaining the first phase autofocus image and the second phase autofocus image via a sensor having a plurality of pairs of phase autofocus pixel sensors, wherein the sensor comprises a plurality of image pixel sensors.

Further to the first embodiments, the method further comprises obtaining the first phase autofocus image and the second phase autofocus image via a sensor having a plurality of pairs of phase autofocus pixel sensors and a plurality of image pixel sensors.

Further to the first embodiments, determining a first accumulated phase difference value associated with a first phase shift comprises summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image.

Further to the first embodiments, determining a first accumulated phase difference value associated with a first phase shift comprises summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image, wherein the pixel of the first phase autofocus image and the pixel of the second phase autofocus image comprise a pixel pair associated with a pair of phase autofocus pixels of a sensor.

Further to the first embodiments, determining a first accumulated phase difference value associated with a first phase shift comprises summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image, wherein the pixel of the second phase autofocus image is shifted by an offset with respect to the pixel of the first phase autofocus image.

Further to the first embodiments, determining a first accumulated phase difference value associated with a first phase shift comprises summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image, wherein the pixel of the first phase autofocus image and the pixel of the second phase autofocus image comprise at least one of a pixel pair associated with a pair of phase autofocus pixels of a sensor or pixels shifted by an offset such that the pixel of the second phase autofocus image is shifted by the offset with respect to the pixel of the first phase autofocus image.

Further to the first embodiments, determining a first accumulated phase difference value associated with a first phase shift comprises summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image, wherein the thresholding comprises comparing a maximum of the phase autofocus value for the pixel of the first phase autofocus image and the phase autofocus value for the pixel of the second phase autofocus image to a high threshold and a minimum of the phase autofocus value for the pixel of the first phase autofocus image and the phase autofocus value for the pixel of the second phase autofocus image to a low threshold and setting the threshold determined value to one when the maximum of the phase autofocus value for the pixel of the first phase autofocus image and the phase autofocus value for the pixel of the second phase autofocus image is not greater than the high threshold and the minimum of the phase autofocus value for the pixel of the first phase autofocus image and the phase autofocus value for the pixel of the second phase autofocus image is not less than the low threshold, and otherwise, setting the threshold determined value to zero.

Further to the first embodiments, wherein performing the curve fitting comprises determining a global minimum of the plurality of accumulated phase difference values, fitting a quadratic function to the global minimum of the plurality of accumulated phase difference values, a first accumulated phase difference value, and a second accumulated phase difference value, wherein the first and second accumulated phase difference values are each shift adjacent to the global minimum, fitting linear functions to remaining accumulated phase difference values of the plurality of accumulated phase difference values, each linear function comprising a line between shift adjacent accumulated phase difference values of the remaining accumulated phase difference, and generating the accumulated phase difference values fitted curve based on the quadratic function and the linear functions.

Further to the first embodiments, wherein performing the curve fitting comprises determining a global minimum of the plurality of accumulated phase difference values, fitting a quadratic function to the global minimum of the plurality of accumulated phase difference values, a first accumulated phase difference value, and a second accumulated phase difference value, wherein the first and second accumulated phase difference values are each shift adjacent to the global minimum, fitting linear functions to remaining accumulated phase difference values of the plurality of accumulated phase difference values, each linear function comprising a line between shift adjacent accumulated phase difference values of the remaining accumulated phase difference, and generating the accumulated phase difference values fitted curve based on the quadratic function and the linear functions, the method further comprising determining the final phase shift as a minimum of the accumulated phase difference values fitted curve.

Further to the first embodiments, generating the reliability value comprises determining a plurality of measures associated with the accumulated phase difference values fitted curve and a plurality of weights associated with the plurality of measures and generating the reliability value based on the plurality of measures and the plurality of weights.

Further to the first embodiments, generating the reliability value comprises determining a plurality of measures associated with the accumulated phase difference values fitted curve and a plurality of weights associated with the plurality of measures and generating the reliability value based on the plurality of measures and the plurality of weights, wherein generating the reliability value based on the plurality of measures and the plurality of weights comprises generating a value for each plurality of measures and weights, the value comprising at least a product of each measure and each weight and taking a product over the plurality of values to determine the reliability values.

Further to the first embodiments, generating the reliability value comprises determining a plurality of measures associated with the accumulated phase difference values fitted curve and a plurality of weights associated with the plurality of measures and generating the reliability value based on the plurality of measures and the plurality of weights, wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values.

Further to the first embodiments, generating the reliability value comprises determining a plurality of measures associated with the accumulated phase difference values fitted curve and a plurality of weights associated with the plurality of measures and generating the reliability value based on the plurality of measures and the plurality of weights, wherein the plurality of measures further comprise at least one of a measure of a signal-to-noise ratio of the region of interest or a measure of reliability based brightness around pixel pairs in the region of interest.

Further to the first embodiments, generating the reliability value comprises determining a plurality of measures associated with the accumulated phase difference values fitted curve and a plurality of weights associated with the plurality of measures and generating the reliability value based on the plurality of measures and the plurality of weights, wherein generating the reliability value based on the plurality of measures and the plurality of weights comprises generating a value for each plurality of measures and weights, the value comprising at least a product of each measure and each weight and taking a product over the plurality of values to determine the reliability values, and/or wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values, and/or wherein the plurality of measures further comprise at least one of a measure of a signal-to-noise ratio of the region of interest or a measure of reliability based brightness around pixel pairs in the region of interest.

Further to the first embodiments, focusing the imaging device based at least in part on the reliability value comprises performing autofocus using the final phase shift based on a comparison of the reliability value to a threshold.

Further to the first embodiments, focusing the imaging device based at least in part on the reliability value comprises performing autofocus using a contrast based autofocus value based on a comparison of the reliability value to a threshold.

Further to the first embodiments, focusing the imaging device based at least in part on the reliability value comprises at least one of performing autofocus using the final phase shift based or performing autofocus using a contrast based autofocus value.

Further to the first embodiments, the method further comprises generating a second reliability value associated with a second final phase shift for a second region of interest of the scene, wherein focusing the imaging device based at least in part on the reliability value comprises focusing the imaging device using the final phase shift based at least in part on the reliability value being greater the second reliability value.

In one or more second embodiments, a system for providing autofocus for an imaging device comprises a memory configured to store image data and a central processing unit coupled to the memory, wherein the central processing unit comprises accumulated phase difference circuitry configured to determine, for a region of interest of a scene, a plurality of accumulated phase difference values associated with a plurality of phase shifts for a first phase autofocus image and a second phase autofocus image, curve fitting circuitry configured to perform a curve fitting based on the plurality of accumulated phase difference values and the plurality of phase shifts to generate an accumulated phase difference values fitted curve, focus phase shift reliability circuitry configured to generate a reliability value associated with a focus phase shift for the plurality of accumulated phase difference values and the plurality of phase shifts based at least in part on the accumulated phase difference values fitted curve, and autofocus circuitry configured to focus the imaging device based at least in part on the reliability value.

Further to the second embodiments, the accumulated phase difference circuitry being configured to determine the plurality of accumulated phase difference values comprises the accumulated phase difference circuitry being configured to determine a first accumulated phase difference value associated with a first phase shift by being configured to sum, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image Further to the second embodiments, the curve fitting circuitry configured to perform the curve fitting comprises the curve fitting circuitry being configured to determine a global minimum of the plurality of accumulated phase difference values, fit a quadratic function to the global minimum of the plurality of accumulated phase difference values, a first accumulated phase difference value, and a second accumulated phase difference value, wherein the first and second accumulated phase difference values are each shift adjacent to the global minimum, fit linear functions to remaining accumulated phase difference values of the plurality of accumulated phase difference values, each linear function comprising a line between shift adjacent accumulated phase difference values of the remaining accumulated phase difference, and generate the accumulated phase difference values fitted curve based on the quadratic function and the linear functions.

Further to the second embodiments, the curve fitting circuitry configured to perform the curve fitting comprises the curve fitting circuitry being configured to determine a global minimum of the plurality of accumulated phase difference values, fit a quadratic function to the global minimum of the plurality of accumulated phase difference values, a first accumulated phase difference value, and a second accumulated phase difference value, wherein the first and second accumulated phase difference values are each shift adjacent to the global minimum, fit linear functions to remaining accumulated phase difference values of the plurality of accumulated phase difference values, each linear function comprising a line between shift adjacent accumulated phase difference values of the remaining accumulated phase difference, and generate the accumulated phase difference values fitted curve based on the quadratic function and the linear functions, the system further comprising final phase shift circuitry configured to determine the final phase shift as a minimum of the accumulated phase difference values fitted curve.

Further to the second embodiments, the focus phase shift reliability circuitry being configured to generate the reliability value comprises the focus phase shift reliability circuitry being configured to determine a plurality of measures associated with the accumulated phase difference values fitted curve and a plurality of weights associated with the plurality of measures and generate the reliability value based on the plurality of measures and the plurality of weights.

Further to the second embodiments, the focus phase shift reliability circuitry being configured to generate the reliability value comprises the focus phase shift reliability circuitry being configured to determine a plurality of measures associated with the accumulated phase difference values fitted curve and a plurality of weights associated with the plurality of measures and generate the reliability value based on the plurality of measures and the plurality of weights, wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values.

Further to the second embodiments, the focus phase shift reliability circuitry being configured to generate the reliability value comprises the focus phase shift reliability circuitry being configured to determine a plurality of measures associated with the accumulated phase difference values fitted curve and a plurality of weights associated with the plurality of measures and generate the reliability value based on the plurality of measures and the plurality of weights, wherein the plurality of measures further comprise at least one of a measure of a signal-to-noise ratio of the region of interest or a measure of reliability based brightness around pixel pairs in the region of interest.

In one or more third embodiments, a system for providing autofocus for an imaging device comprises means for determining, for a region of interest of a scene, a plurality of accumulated phase difference values associated with a plurality of phase shifts for a first phase autofocus image and a second phase autofocus image, means for performing a curve fitting based on the plurality of accumulated phase difference values and the plurality of phase shifts to generate an accumulated phase difference values fitted curve, means for generating a reliability value associated with a focus phase shift for the plurality of accumulated phase difference values and the plurality of phase shifts based at least in part on the accumulated phase difference values fitted curve, and means for focusing the imaging device based at least in part on the reliability value.

Further to the third embodiments, the means for determining the plurality of accumulated phase difference values comprise means for determining a first accumulated phase difference value associated with a first phase shift by summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image.

Further to the third embodiments, the means for performing the curve fitting comprise means for determining a global minimum of the plurality of accumulated phase difference values, means for fitting a quadratic function to the global minimum of the plurality of accumulated phase difference values, a first accumulated phase difference value, and a second accumulated phase difference value, wherein the first and second accumulated phase difference values are each shift adjacent to the global minimum, means for fitting linear functions to remaining accumulated phase difference values of the plurality of accumulated phase difference values, each linear function comprising a line between shift adjacent accumulated phase difference values of the remaining accumulated phase difference, and means for generating the accumulated phase difference values fitted curve based on the quadratic function and the linear functions.

Further to the third embodiments, the means for performing the curve fitting comprise means for determining a global minimum of the plurality of accumulated phase difference values, means for fitting a quadratic function to the global minimum of the plurality of accumulated phase difference values, a first accumulated phase difference value, and a second accumulated phase difference value, wherein the first and second accumulated phase difference values are each shift adjacent to the global minimum, means for fitting linear functions to remaining accumulated phase difference values of the plurality of accumulated phase difference values, each linear function comprising a line between shift adjacent accumulated phase difference values of the remaining accumulated phase difference, and means for generating the accumulated phase difference values fitted curve based on the quadratic function and the linear functions, the system further comprising means for determining the final phase shift as a minimum of the accumulated phase difference values fitted curve.

Further to the third embodiments, the means for generating the reliability value comprise means for determining a plurality of measures associated with the accumulated phase difference values fitted curve and a plurality of weights associated with the plurality of measures and means for generating the reliability value based on the plurality of measures and the plurality of weights.

Further to the third embodiments, the means for generating the reliability value comprise means for determining a plurality of measures associated with the accumulated phase difference values fitted curve and a plurality of weights associated with the plurality of measures and means for generating the reliability value based on the plurality of measures and the plurality of weights, wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values.

Further to the third embodiments, the means for generating the reliability value comprise means for determining a plurality of measures associated with the accumulated phase difference values fitted curve and a plurality of weights associated with the plurality of measures and means for generating the reliability value based on the plurality of measures and the plurality of weights, wherein the plurality of measures further comprise at least one of a measure of a signal-to-noise ratio of the region of interest or a measure of reliability based brightness around pixel pairs in the region of interest.

In one or more fourth embodiments, at least one machine readable medium comprises a plurality of instructions that in response to being executed on an imaging device, cause the imaging device to provide autofocus by determining, for a region of interest of a scene, a plurality of accumulated phase difference values associated with a plurality of phase shifts for a first phase autofocus image and a second phase autofocus image, performing a curve fitting based on the plurality of accumulated phase difference values and the plurality of phase shifts to generate an accumulated phase difference values fitted curve, generating a reliability value associated with a focus phase shift for the plurality of accumulated phase difference values and the plurality of phase shifts based at least in part on the accumulated phase difference values fitted curve, and focusing the imaging device based at least in part on the reliability value.

Further to the fourth embodiments, determining a first accumulated phase difference value associated with a first phase shift comprises summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image.

Further to the fourth embodiments, performing the curve fitting comprises determining a global minimum of the plurality of accumulated phase difference values, fitting a quadratic function to the global minimum of the plurality of accumulated phase difference values, a first accumulated phase difference value, and a second accumulated phase difference value, wherein the first and second accumulated phase difference values are each shift adjacent to the global minimum, fitting linear functions to remaining accumulated phase difference values of the plurality of accumulated phase difference values, each linear function comprising a line between shift adjacent accumulated phase difference values of the remaining accumulated phase difference, and generating the accumulated phase difference values fitted curve based on the quadratic function and the linear functions.

Further to the fourth embodiments, performing the curve fitting comprises determining a global minimum of the plurality of accumulated phase difference values, fitting a quadratic function to the global minimum of the plurality of accumulated phase difference values, a first accumulated phase difference value, and a second accumulated phase difference value, wherein the first and second accumulated phase difference values are each shift adjacent to the global minimum, fitting linear functions to remaining accumulated phase difference values of the plurality of accumulated phase difference values, each linear function comprising a line between shift adjacent accumulated phase difference values of the remaining accumulated phase difference, and generating the accumulated phase difference values fitted curve based on the quadratic function and the linear functions, the machine readable medium further comprising instructions that cause the imaging device to provide autofocus by determining the final phase shift as a minimum of the accumulated phase difference values fitted curve.

Further to the fourth embodiments, generating the reliability value comprises determining a plurality of measures associated with the accumulated phase difference values fitted curve and a plurality of weights associated with the plurality of measures and generating the reliability value based on the plurality of measures and the plurality of weights.

Further to the fourth embodiments, generating the reliability value comprises determining a plurality of measures associated with the accumulated phase difference values fitted curve and a plurality of weights associated with the plurality of measures and generating the reliability value based on the plurality of measures and the plurality of weights, wherein generating the reliability value based on the plurality of measures and the plurality of weights comprises generating a value for each plurality of measures and weights, the value comprising at least a product of each measure and each weight and taking a product over the plurality of values to determine the reliability values.

Further to the fourth embodiments, generating the reliability value comprises determining a plurality of measures associated with the accumulated phase difference values fitted curve and a plurality of weights associated with the plurality of measures and generating the reliability value based on the plurality of measures and the plurality of weights, wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values.

Further to the fourth embodiments, generating the reliability value comprises determining a plurality of measures associated with the accumulated phase difference values fitted curve and a plurality of weights associated with the plurality of measures and generating the reliability value based on the plurality of measures and the plurality of weights, wherein the plurality of measures further comprise at least one of a measure of a signal-to-noise ratio of the region of interest or a measure of reliability based brightness around pixel pairs in the region of interest.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for providing autofocus for an imaging device comprising:
    determining, for a region of interest of a scene, a plurality of accumulated phase difference values associated with a plurality of phase shifts for a first phase autofocus image and a second phase autofocus image;
    performing a curve fitting based on the plurality of accumulated phase difference values and the plurality of phase shifts to generate an accumulated phase difference values fitted curve;
    generating a reliability value associated with a focus phase shift for the plurality of accumulated phase difference values and the plurality of phase shifts based at least in part on the accumulated phase difference values fitted curve; and
    focusing the imaging device based at least in part on the reliability value.

2. The method of claim 1, wherein determining a first accumulated phase difference value associated with a first phase shift comprises:
    summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image.

3. The method of claim 2, wherein the pixel of the first phase autofocus image and the pixel of the second phase autofocus image comprise at least one of a pixel pair associated with a pair of phase autofocus pixels of a sensor or pixels shifted by an offset such that the pixel of the second phase autofocus image is shifted by the offset with respect to the pixel of the first phase autofocus image.

4. The method of claim 2, wherein the thresholding comprises:
    comparing a maximum of the phase autofocus value for the pixel of the first phase autofocus image and the phase autofocus value for the pixel of the second phase autofocus image to a high threshold and a minimum of the phase autofocus value for the pixel of the first phase autofocus image and the phase autofocus value for the pixel of the second phase autofocus image to a low threshold; and
    setting the threshold determined value to one when the maximum of the phase autofocus value for the pixel of the first phase autofocus image and the phase autofocus value for the pixel of the second phase autofocus image is not greater than the high threshold and the minimum of the phase autofocus value for the pixel of the first phase autofocus image and the phase autofocus value for the pixel of the second phase autofocus image is not less than the low threshold, and otherwise, setting the threshold determined value to zero.

5. The method of claim 1, wherein performing the curve fitting comprises:
    determining a global minimum of the plurality of accumulated phase difference values;
    fitting a quadratic function to the global minimum of the plurality of accumulated phase difference values, a first accumulated phase difference value, and a second accumulated phase difference value, wherein the first and second accumulated phase difference values are each shift adjacent to the global minimum;
    fitting linear functions to remaining accumulated phase difference values of the plurality of accumulated phase difference values, each linear function comprising a line between shift adjacent accumulated phase difference values of a remaining accumulated phase difference; and
    generating the accumulated phase difference values fitted curve based on the quadratic function and the linear functions.

6. The method of claim 5, further comprising:
    determining a final phase shift as a minimum of the accumulated phase difference values fitted curve.

7. The method of claim 1, wherein generating the reliability value comprises:
    determining a plurality of measures associated with the accumulated phase difference values fitted curve and a plurality of weights associated with the plurality of measures; and
    generating the reliability value based on the plurality of measures and the plurality of weights.

8. The method of claim 7, wherein generating the reliability value based on the plurality of measures and the plurality of weights comprises:
    generating a value for each plurality of measures and weights, the value comprising at least a product of each measure and each weight; and
    taking the product over the plurality of values to determine the reliability values.

9. The method of claim 7, wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values.

10. The method of claim 7, wherein the plurality of measures further comprise at least one of a measure of a signal-to-noise ratio of the region of interest or a measure of reliability based brightness around pixel pairs in the region of interest.

11. The method of claim 1, wherein focusing the imaging device based at least in part on the reliability value comprises at least one of performing autofocus using a final phase shift based or performing autofocus using a contrast based autofocus value.

12. The method of claim 1, further comprising:
    obtaining the first phase autofocus image and the second phase autofocus image via a sensor having a plurality of pairs of phase autofocus pixel sensors and a plurality of image pixel sensors.

13. A system for providing autofocus for an imaging device, comprising:
    a memory configured to store image data; and
    a central processing unit coupled to the memory, wherein the central processing unit comprises:
        accumulated phase difference circuitry configured to determine, for a region of interest of a scene, a plurality of accumulated phase difference values associated with a plurality of phase shifts for a first phase autofocus image and a second phase autofocus image;

curve fitting circuitry configured to perform a curve fitting based on the plurality of accumulated phase difference values and the plurality of phase shifts to generate an accumulated phase difference values fitted curve;

focus phase shift reliability circuitry configured to generate a reliability value associated with a focus phase shift for the plurality of accumulated phase difference values and the plurality of phase shifts based at least in part on the accumulated phase difference values fitted curve; and autofocus circuitry configured to focus the imaging device based at least in part on the reliability value.

14. The system of claim 13, wherein the accumulated phase difference circuitry being configured to determine the plurality of accumulated phase difference values comprises the accumulated phase difference circuitry being configured to determine a first accumulated phase difference value associated with a first phase shift by being configured to sum, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image.

15. The system of claim 13, wherein the curve fitting circuitry configured to perform the curve fitting comprises the curve fitting circuitry being configured to:

determine a global minimum of the plurality of accumulated phase difference values;

fit a quadratic function to the global minimum of the plurality of accumulated phase difference values, a first accumulated phase difference value, and a second accumulated phase difference value, wherein the first and second accumulated phase difference values are each shift adjacent to the global minimum;

fit linear functions to remaining accumulated phase difference values of the plurality of accumulated phase difference values, each linear function comprising a line between shift adjacent accumulated phase difference values of a remaining accumulated phase difference; and generate the accumulated phase difference values fitted curve based on the quadratic function and the linear functions.

16. The system of claim 15, further comprising:

final phase shift circuitry configured to determine a final phase shift as a minimum of the accumulated phase difference values fitted curve.

17. The system of claim 13, wherein the focus phase shift reliability circuitry being configured to generate the reliability value comprises the focus phase shift reliability circuitry being configured to:

determine a plurality of measures associated with the accumulated phase difference values fitted curve and a plurality of weights associated with the plurality of measures; and generate the reliability value based on the plurality of measures and the plurality of weights.

18. The system of claim 17, wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values.

19. The system of claim 17, wherein the plurality of measures further comprise at least one of a measure of a signal-to-noise ratio of the region of interest or a measure of reliability based brightness around pixel pairs in the region of interest.

20. At least one non-transitory machine readable medium comprising a plurality of instructions that in response to being executed on an imaging device, cause the imaging device to provide autofocus by:

determining, for a region of interest of a scene, a plurality of accumulated phase difference values associated with a plurality of phase shifts for a first phase autofocus image and a second phase autofocus image;

performing a curve fitting based on the plurality of accumulated phase difference values and the plurality of phase shifts to generate an accumulated phase difference values fitted curve;

generating a reliability value associated with a focus phase shift for the plurality of accumulated phase difference values and the plurality of phase shifts based at least in part on the accumulated phase difference values fitted curve; and focusing the imaging device based at least in part on the reliability value.

21. The at least one non-transitory machine readable medium of claim 20, wherein determining a first accumulated phase difference value associated with a first phase shift comprises:

summing, over the region of interest, a plurality of products, each product comprising the product of a difference between a phase autofocus value for a pixel of the first phase autofocus image and a phase autofocus value for a pixel of the second phase autofocus image and a threshold determined value, wherein the threshold determined value comprises zero or one based on a thresholding based on the phase autofocus value for the pixel of the first phase autofocus image and the phase autofocus value for the pixel of the second phase autofocus image.

22. The at least one non-transitory machine readable medium of claim 20, wherein performing the curve fitting comprises:

determining a global minimum of the plurality of accumulated phase difference values;

fitting a quadratic function to the global minimum of the plurality of accumulated phase difference values, a first accumulated phase difference value, and a second accumulated phase difference value, wherein the first and second accumulated phase difference values are each shift adjacent to the global minimum;

fitting linear functions to remaining accumulated phase difference values of the plurality of accumulated phase difference values, each linear function comprising a line between shift adjacent accumulated phase difference values of a remaining accumulated phase difference; and generating the accumulated phase difference values fitted curve based on the quadratic function and the linear functions.

23. The at least one non-transitory machine readable medium of claim 22, further comprising instructions that cause the imaging device to provide autofocus by:

determining a final phase shift as a minimum of the accumulated phase difference values fitted curve.

24. The at least one non-transitory machine readable medium of claim 20, wherein generating the reliability value comprises:
 determining a plurality of measures associated with the accumulated phase difference values fitted curve and a plurality of weights associated with the plurality of measures; and
 generating the reliability value based on the plurality of measures and the plurality of weights.

25. The at least one non-transitory machine readable medium of claim 24, wherein the plurality of measures comprises at least one of a measure of a dynamic range of the accumulated phase difference values fitted curve, a measure of sign changes of the accumulated phase difference values fitted curve, a measure of a symmetry of the accumulated phase difference values fitted curve, or a measure of a sharpness of a valley around a global minimum of the plurality of accumulated phase difference values.

\* \* \* \* \*